US012343748B2

(12) United States Patent
McAfee et al.

(10) Patent No.: US 12,343,748 B2
(45) Date of Patent: Jul. 1, 2025

(54) MULTI-MODE ROTOR SPRINKLER APPARATUS AND METHOD

(71) Applicant: Rain Bird Corporation, Azusa, CA (US)

(72) Inventors: Michael A. McAfee, Tucson, AZ (US); Saul Le-Garcia Rodolfo, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 592 days.

(21) Appl. No.: 17/694,948

(22) Filed: Mar. 15, 2022

(65) Prior Publication Data

US 2022/0297140 A1 Sep. 22, 2022

Related U.S. Application Data

(60) Provisional application No. 63/161,843, filed on Mar. 16, 2021.

(51) Int. Cl.

*B05B 3/04* (2006.01)
*B05B 3/02* (2006.01)
*B05B 17/04* (2006.01)

(52) U.S. Cl.

CPC ............ *B05B 3/0454* (2013.01); *B05B 3/026* (2013.01); *B05B 17/04* (2013.01)

(58) Field of Classification Search

CPC ....... B05B 3/0454; B05B 3/026; B05B 17/04; B05B 3/0431; B05B 15/74

(Continued)

(56) References Cited

U.S. PATENT DOCUMENTS 2,187,549 A 1/1940 Thompson
2,268,855 A 1/1942 Brooks (Continued)

FOREIGN PATENT DOCUMENTS

EP 1818104 A1 * 8/2007 ........... B05B 3/0486
EP 1864717 12/2007

(Continued)

OTHER PUBLICATIONS

Machine Translation of EP-1864717-A2 Description, Oct. 2024, Espacenet, pp. 1-9 (Year: 2024).*

(Continued)

*Primary Examiner* — Joseph A Greenlund
*Assistant Examiner* — Kevin Edward Schwartz
(74) *Attorney, Agent, or Firm* — Fitch, Even, Tabin & Flannery, LLP

(57) ABSTRACT

A multi-mode sprinkler adjustable for part or full circle operation to irrigate a selected area is provided. The sprinkler includes a nozzle for dispensing fluid, a set of gears for rotating the nozzle and an arc setting mechanism that cooperates with the set of gears. The arc setting mechanism comprises a fixed trip for switching to a first direction for the nozzle and an adjustable trip movable relative to the fixed trip for setting an arc of rotation for the nozzle in the part circle mode. The arc setting mechanism also includes a toggle for engaging the fixed trip and the adjustable to switch between a first direction and a second direction when in the part circle mode. In the full circle mode, the adjustable trip overlaps at least in part the fixed trip, such that the fixed trip deflects the toggle radially inward, allowing continuous rotation of the nozzle.

17 Claims, 17 Drawing Sheets

(58) Field of Classification Search
USPC .................................................. 239/206, 242
See application file for complete search history.

(56) References Cited

U.S. PATENT DOCUMENTS

| | | | |
|---|---|---|---|
| 2,625,411 | A | 1/1953 | Unger |
| 2,721,052 | A | 10/1955 | Richmond |
| 2,950,132 | A | 8/1960 | Kocsuta |
| 2,999,701 | A | 9/1961 | Blair |
| 3,091,399 | A | 5/1963 | Kennedy |
| 3,095,148 | A | 6/1963 | Smith |
| 3,107,056 | A | 10/1963 | Hunter |
| 3,135,259 | A | 6/1964 | Evans |
| 3,204,988 | A | 9/1965 | Dunton |
| 3,244,373 | A | 4/1966 | Hait |
| 3,263,930 | A | 8/1966 | Friedmann |
| 3,334,817 | A | 8/1967 | Miller |
| 3,521,822 | A | 7/1970 | Friedmann |
| 3,523,647 | A | 8/1970 | Radecki |
| 3,645,451 | A | 2/1972 | Hauser |
| 3,655,132 | A | 4/1972 | Rosic |
| 3,782,638 | A | 1/1974 | Bumpstead |
| 3,921,912 | A | 11/1975 | Hayes |
| 3,934,820 | A | 1/1976 | Phaup |
| 4,059,227 | A | 11/1977 | Hunter |
| 4,091,997 | A | 5/1978 | Ridgway |
| 4,119,275 | A | 10/1978 | Hunter |
| 4,149,358 | A | 4/1979 | Comer |
| 4,198,000 | A | 4/1980 | Hunter |
| 4,204,642 | A | 5/1980 | Hunter |
| 4,220,283 | A | 9/1980 | Citron |
| 4,265,404 | A | 5/1981 | Hunter |
| 4,272,024 | A | 6/1981 | Kah |
| 4,301,967 | A | 11/1981 | Hunter |
| 4,398,666 | A | 8/1983 | Hunter |
| 4,406,440 | A | 9/1983 | Kulle |
| 4,417,691 | A | 11/1983 | Lockwood |
| 4,451,635 | A | 5/1984 | Gould |
| 4,471,908 | A | 9/1984 | Hunter |
| 4,498,626 | A | 2/1985 | Pitchford |
| 4,501,391 | A | 2/1985 | Hunter |
| 4,559,653 | A | 12/1985 | Mathews |
| 4,569,485 | A | 2/1986 | Walto |
| 4,624,412 | A | 11/1986 | Hunter |
| 4,625,914 | A | 12/1986 | Sexton |
| 4,634,052 | A | 1/1987 | Grizzle |
| 4,635,975 | A | 1/1987 | Campbell |
| 4,637,636 | A | 1/1987 | Guest |
| 4,650,118 | A | 3/1987 | Saarem |
| 4,681,259 | A | 7/1987 | Troup |
| 4,682,755 | A | 7/1987 | Bernstein |
| 4,702,417 | A | 10/1987 | Hartley |
| 4,708,290 | A | 11/1987 | Osmond |
| 4,708,291 | A | 11/1987 | Grundy |
| 4,718,605 | A | 1/1988 | Hunter |
| 4,732,861 | A | 3/1988 | Sinclair |
| 4,773,595 | A | 9/1988 | Livne |
| 4,784,325 | A | 11/1988 | Walker |
| 4,787,558 | A | 11/1988 | Sexton |
| 4,819,875 | A | 4/1989 | Beal |
| 4,867,378 | A | 9/1989 | Kah |
| 4,867,379 | A | 9/1989 | Hunter |
| 4,892,252 | A | 1/1990 | Bruninga |
| 4,898,332 | A | 2/1990 | Hunter |
| 4,901,924 | A | 2/1990 | Kah |
| 4,919,337 | A | 4/1990 | Van Leeuwen |
| 4,925,098 | A | 5/1990 | Di Paola |
| 4,955,542 | A | 9/1990 | Kah |
| 4,961,534 | A | 10/1990 | Tyler |
| 4,967,961 | A | 11/1990 | Hunter |
| 4,971,256 | A | 11/1990 | Malcolm |
| 4,972,993 | A | 11/1990 | Van Leeuwen |
| 5,009,368 | A | 4/1991 | Streck |
| 5,031,833 | A | 7/1991 | Alkalay |
| 5,031,840 | A | 7/1991 | Grundy |
| 5,048,757 | A | 9/1991 | Van Leeuwen |
| 5,050,800 | A | 9/1991 | Lamar |
| 5,052,621 | A | 10/1991 | Katzer |
| 5,097,861 | A | 3/1992 | Hopkins |
| 5,098,021 | A | 3/1992 | Kah |
| 5,115,977 | A | 5/1992 | Alkalay |
| 5,148,990 | A | 9/1992 | Kah |
| 5,148,991 | A | 9/1992 | Kah |
| 5,158,232 | A | 10/1992 | Tyler |
| 5,174,501 | A | 12/1992 | Hadar |
| 5,226,602 | A | 7/1993 | Cochran |
| 5,239,587 | A | 8/1993 | Muckelrath |
| 5,251,938 | A | 10/1993 | Erickson |
| 5,259,587 | A | 11/1993 | D'Alessio |
| 5,288,023 | A | 2/1994 | Han |
| 5,291,842 | A | 3/1994 | Sallstrom |
| 5,330,103 | A | 7/1994 | Eckstein |
| 5,360,167 | A | 11/1994 | Grundy |
| 5,375,768 | A | 12/1994 | Clark |
| 5,383,600 | A | 1/1995 | Verbera |
| 5,385,600 | A | 1/1995 | Jounela |
| 5,394,678 | A | 3/1995 | Lonn |
| 5,417,370 | A | 5/1995 | Kah |
| 5,444,611 | A | 8/1995 | Woytowitz |
| RE35,037 | E | 9/1995 | Kah |
| 5,456,411 | A | 10/1995 | Scott |
| 5,462,251 | A | 10/1995 | Kawabe |
| 5,473,961 | A | 12/1995 | Jackson |
| 5,487,572 | A | 1/1996 | Combot-Courrau |
| 5,526,982 | A | 6/1996 | McKenzie |
| 5,527,073 | A | 6/1996 | Readman |
| 5,556,036 | A | 9/1996 | Chase |
| 5,588,594 | A | 12/1996 | Kah |
| 5,611,488 | A | 3/1997 | Frolich |
| 5,630,551 | A | 5/1997 | Forcier |
| 5,641,122 | A | 6/1997 | Alkalai |
| 5,653,390 | A | 8/1997 | Kah |
| 5,673,855 | A | 10/1997 | Nguyen |
| 5,676,315 | A | 10/1997 | Han |
| 5,681,062 | A | 10/1997 | Fukao |
| 5,685,486 | A | 11/1997 | Spenser |
| D388,502 | S | 12/1997 | Carl |
| 5,695,122 | A | 12/1997 | Messinger |
| 5,695,123 | A | 12/1997 | Le |
| 5,695,224 | A | 12/1997 | Grenier |
| 5,699,962 | A | 12/1997 | Scott |
| 5,709,417 | A | 1/1998 | Verbeck |
| 5,722,593 | A | 3/1998 | McKenzie |
| 5,758,827 | A | 6/1998 | Van Le |
| 5,762,270 | A | 6/1998 | Kearby |
| 5,765,757 | A | 6/1998 | Bendall |
| 5,816,627 | A | 10/1998 | Readman |
| 5,823,440 | A | 10/1998 | Clark |
| 5,826,797 | A | 10/1998 | Kah |
| 5,868,316 | A | 2/1999 | Scott |
| 5,899,386 | A | 5/1999 | Miyasato |
| 5,911,443 | A | 6/1999 | Le Quere |
| 5,938,122 | A | 8/1999 | Heren |
| 5,975,430 | A | 11/1999 | Larsen |
| 5,992,760 | A | 11/1999 | Kearby |
| 6,000,632 | A | 12/1999 | Wallace |
| 6,029,907 | A | 2/2000 | McKenzie |
| 6,039,268 | A | 3/2000 | Grundy |
| 6,042,021 | A | 3/2000 | Clark |
| 6,050,502 | A | 4/2000 | Clark |
| 6,085,995 | A | 7/2000 | Kah |
| 6,109,545 | A | 8/2000 | Kah |
| 6,109,664 | A | 8/2000 | Guest |
| 6,138,924 | A | 10/2000 | Hunter |
| 6,155,493 | A | 12/2000 | Kearby |
| 6,168,577 | B1 | 1/2001 | Niederjohn |
| 6,182,909 | B1 | 2/2001 | Kah |
| 6,209,801 | B1 | 4/2001 | Kearby |
| 6,227,455 | B1 | 5/2001 | Scott |
| 6,231,090 | B1 | 5/2001 | Fukao |
| 6,237,862 | B1 | 5/2001 | Kah |
| 6,241,158 | B1 | 6/2001 | Clark |
| 6,244,521 | B1 | 6/2001 | Sesser |
| 6,293,147 | B1 | 9/2001 | Parker |

(56) References Cited

U.S. PATENT DOCUMENTS 6,336,597 B1 1/2002 Kah
6,351,929 B1 3/2002 Gust
6,364,217 B1 4/2002 Lockwood
D458,554 S 6/2002 Jolly
6,464,151 B1 10/2002 Cordua
6,478,237 B2 11/2002 Kearby
6,488,401 B1 12/2002 Seaman
6,491,235 B1 12/2002 Scott
6,494,384 B1 12/2002 Meyer
6,499,672 B1 12/2002 Sesser
6,568,608 B2 5/2003 Sirkin
6,601,781 B2 8/2003 Kah
6,607,147 B2 8/2003 Schneider
6,612,623 B2 9/2003 Salomon-Bahls
6,637,672 B2 10/2003 Cordua
6,651,905 B2 11/2003 Sesser
6,655,830 B1 12/2003 Seaman
6,663,145 B1 12/2003 Lyall
6,695,223 B2 2/2004 Beutler
6,712,796 B2 3/2004 Fentis
6,721,630 B1 4/2004 Woytowitz
6,722,629 B1 4/2004 Nakazawa
6,732,950 B2 5/2004 Ingham, Jr
6,732,952 B2 5/2004 Kah
6,736,332 B2 5/2004 Sesser
6,799,732 B2 10/2004 Sirkin
6,802,458 B2 10/2004 Gregory
6,814,305 B2 11/2004 Townsend
6,817,543 B2 11/2004 Clark
6,824,172 B1 11/2004 Komolrochanaporn
6,827,291 B2 12/2004 Townsend
6,834,816 B2 12/2004 Kah, Jr.
6,840,460 B2 1/2005 Clark
6,842,667 B2 1/2005 Beutler
6,848,124 B2 2/2005 Goettl
6,848,632 B2 2/2005 Clark
6,854,664 B2 2/2005 Smith
6,869,026 B2 3/2005 McKenzie
6,871,795 B2 3/2005 Anuskiewicz
6,883,727 B2 4/2005 De Los Santos
6,896,881 B1 5/2005 Russell
6,899,355 B2 5/2005 Klein
6,913,292 B2 7/2005 Snyder, Sr.
6,921,029 B2 7/2005 Lockwood
6,929,236 B1 8/2005 Height
6,942,164 B2 9/2005 Walker
6,945,471 B2 9/2005 Mckenzie
6,957,782 B2 10/2005 Clark
6,988,747 B2 1/2006 Allen
6,991,362 B1 1/2006 Seaman
7,010,394 B1 3/2006 Runge
7,017,831 B2 3/2006 Santiago
7,028,920 B2 4/2006 Hekman
7,032,836 B2 4/2006 Sesser
7,032,844 B2 4/2006 Cordua
7,040,553 B2 5/2006 Clark
7,044,403 B2 5/2006 Kah
7,090,146 B1 8/2006 Ericksen
7,111,875 B2 9/2006 Ball
7,121,593 B2 10/2006 Snyder, Sr
7,133,749 B2 11/2006 Goldberg
7,134,613 B2 11/2006 Kah
7,143,692 B2 12/2006 Schmitt
7,143,962 B2 12/2006 Kah, Jr.
7,152,814 B1 12/2006 Schapper
7,159,795 B2 1/2007 Sesser
7,168,632 B2 1/2007 Kates
7,191,958 B1 3/2007 Wang
7,195,287 B2 3/2007 Wai
7,225,057 B2 5/2007 Froman
7,226,003 B2 6/2007 Kah
7,232,078 B2 6/2007 Kah, Jr.
7,232,081 B2 6/2007 Kah
7,234,651 B2 6/2007 Mousavi
7,255,291 B1 8/2007 Lo
7,287,711 B2 10/2007 Crooks
7,287,712 B2 10/2007 Kah
7,322,533 B2 1/2008 Grizzle
7,325,753 B2 2/2008 Gregory
7,337,988 B2 3/2008 McCormick
7,363,113 B2 4/2008 Runge
RE40,440 E 7/2008 Sesser
7,392,936 B1 7/2008 Green
7,392,956 B2 7/2008 McKenzie
7,404,525 B2 7/2008 Santiago
7,412,303 B1 8/2008 Porter
7,422,162 B2 * 9/2008 Wang ...................... B05B 3/044
239/242
7,422,752 B2 9/2008 Hirst
7,429,005 B2 9/2008 Schapper
7,472,840 B2 1/2009 Gregory
7,478,526 B2 1/2009 McAfee
7,500,619 B2 3/2009 Lockwood
7,500,620 B2 3/2009 Cordua
7,500,699 B2 3/2009 Snyder, Sr.
7,530,606 B1 5/2009 Yang
7,552,632 B2 6/2009 Runge
7,574,284 B2 8/2009 Goldberg
7,578,010 B2 8/2009 Goettl
7,581,687 B2 9/2009 Feith
7,584,023 B1 9/2009 Palmer
7,590,471 B2 9/2009 Jacobsen
7,597,273 B2 10/2009 McAfee
7,611,077 B2 11/2009 Sesser
7,621,464 B2 11/2009 Smith
7,621,467 B1 11/2009 Garcia
7,624,934 B2 12/2009 Breedlove
7,629,590 B2 12/2009 Horsky
7,644,870 B2 1/2010 Alexander
7,677,469 B1 3/2010 Clark
7,686,236 B2 3/2010 Alexander
7,703,706 B2 4/2010 Walker
7,717,475 B2 5/2010 Savelle
7,748,646 B2 7/2010 Clark
7,761,189 B2 7/2010 Froman
7,766,259 B2 8/2010 Feith
7,766,396 B1 8/2010 Elbaz
7,793,868 B2 9/2010 Kah
7,820,981 B2 10/2010 Horsky
7,823,804 B2 11/2010 Cordua
7,828,229 B2 11/2010 Kah
7,828,230 B1 11/2010 Anuskiewicz
7,834,816 B2 11/2010 Marino
7,841,547 B2 11/2010 Kah
7,850,094 B2 12/2010 Richmond
7,853,363 B1 12/2010 Porter
7,861,948 B1 1/2011 Crooks
7,862,089 B2 1/2011 Crompton
7,877,168 B1 1/2011 Porter
7,912,588 B2 3/2011 Runge
7,917,249 B2 3/2011 Jacobsen
7,942,161 B2 5/2011 Crompton
7,962,245 B2 6/2011 Runge
RE42,596 E 8/2011 Sesser
7,988,071 B2 8/2011 Bredberg
8,006,919 B2 8/2011 Renquist
8,020,788 B2 9/2011 Luettgen
8,025,315 B2 9/2011 Schreckenberg
8,033,578 B2 10/2011 De Wilde
8,047,456 B2 11/2011 Kah
8,074,456 B2 12/2011 Shah
8,074,897 B2 12/2011 Hunnicutt
8,113,443 B2 2/2012 Zur
8,136,742 B2 3/2012 Cordua
8,136,743 B2 3/2012 Kah
8,205,915 B1 6/2012 Crompton
8,272,578 B1 9/2012 Clark
8,297,533 B2 10/2012 Dunn
8,313,043 B1 11/2012 Crooks
8,469,288 B1 6/2013 Clark
8,474,733 B1 7/2013 Clark
8,628,027 B2 1/2014 Kah
8,636,229 B1 1/2014 Clark
8,636,230 B1 1/2014 Clark

(56) References Cited

U.S. PATENT DOCUMENTS

| | | | | |
|---|---|---|---|---|
| 8,636,233 | B2 | 1/2014 | Clark | |
| 8,727,238 | B1 | 5/2014 | Clark | |
| 8,777,124 | B2 | 7/2014 | Clark | |
| 8,939,384 | B1 | 1/2015 | Anuskiewicz | |
| 8,955,767 | B1 | 2/2015 | Clark | |
| 8,955,768 | B1 | 2/2015 | Clark | |
| 8,991,725 | B2 | 3/2015 | Kah | |
| 8,991,726 | B2 | 3/2015 | Kah, Jr. | |
| 8,991,730 | B2 | 3/2015 | Kah, Jr. | |
| 9,120,111 | B2 | 9/2015 | Nations | |
| 9,156,043 | B2 | 10/2015 | Walker | |
| 9,162,239 | B2 * | 10/2015 | Renner | B05B 3/044 |
| 9,205,435 | B1 | 12/2015 | Clark | |
| 9,446,421 | B1 | 9/2016 | Anuskiewicz | |
| 9,511,387 | B2 | 12/2016 | Keren | |
| 9,616,437 | B2 | 4/2017 | Onofrio | |
| 10,029,265 | B2 | 7/2018 | Bell | |
| 10,099,231 | B2 | 10/2018 | Clark | |
| 10,464,083 | B2 | 11/2019 | Onofrio | |
| 10,717,093 | B2 | 7/2020 | Bell | |
| 10,786,823 | B2 | 9/2020 | Clark | |
| 11,040,359 | B2 | 6/2021 | Simmons | |
| 11,090,671 | B2 | 8/2021 | Zimmerman | |
| 11,684,939 | B2 | 6/2023 | Wright, III | |
| 11,779,948 | B2 | 10/2023 | Renquist | |
| 12,036,569 | B2 | 7/2024 | Zimmerman | |
| 2001/0013557 | A1 | 8/2001 | Kah | |
| 2002/0023972 | A1 | 2/2002 | Kah | |
| 2002/0074432 | A1 | 6/2002 | Kah | |
| 2002/0089175 | A1 | 7/2002 | Ericksen | |
| 2002/0130202 | A1 | 9/2002 | Kah | |
| 2002/0135184 | A1 | 9/2002 | Snyder | |
| 2002/0158145 | A1 | 10/2002 | Schneider | |
| 2003/0006306 | A1 | 1/2003 | Clark | |
| 2003/0006307 | A1 | 1/2003 | Clark | |
| 2003/0010842 | A1 | 1/2003 | Kah | |
| 2003/0075620 | A1 | 4/2003 | Kah, Jr. | |
| 2003/0089796 | A1 | 5/2003 | Kah | |
| 2003/0124704 | A1 | 7/2003 | Strittmatter | |
| 2003/0155433 | A1 | 8/2003 | Gregory | |
| 2004/0014053 | A1 | 1/2004 | Zerhusen | |
| 2004/0050958 | A1 | 3/2004 | McKenzie | |
| 2004/0108392 | A1 | 6/2004 | Kah | |
| 2004/0164178 | A1 | 8/2004 | Carl | |
| 2004/0195358 | A1 | 10/2004 | Santiago | |
| 2004/0195400 | A1 | 10/2004 | Anuskiewicz | |
| 2004/0239115 | A1 | 12/2004 | Wilk | |
| 2004/0241703 | A1 | 12/2004 | Desauvage | |
| 2005/0009105 | A1 | 1/2005 | Goddard | |
| 2005/0042216 | A1 | 2/2005 | Frantz | |
| 2005/0054576 | A1 | 3/2005 | Siler-Khodr | |
| 2005/0103887 | A1 | 5/2005 | McCormick | |
| 2005/0103901 | A1 | 5/2005 | Kah | |
| 2005/0133619 | A1 | 6/2005 | Clark | |
| 2005/0146133 | A1 | 7/2005 | Snyder | |
| 2005/0161534 | A1 | 7/2005 | Kah | |
| 2005/0173557 | A1 | 8/2005 | Kah | |
| 2005/0194461 | A1 | 9/2005 | Goldberg | |
| 2005/0194464 | A1 | 9/2005 | Bruninga | |
| 2005/0214218 | A1 | 9/2005 | Russell | |
| 2005/0233448 | A1 | 10/2005 | Oh | |
| 2006/0049275 | A1 | 3/2006 | Santiago | |
| 2006/0184284 | A1 | 8/2006 | Froman | |
| 2006/0219815 | A1 | 10/2006 | Hekman | |
| 2006/0265852 | A1 | 11/2006 | Snyder | |
| 2006/0273196 | A1 | 12/2006 | Crooks | |
| 2006/0278727 | A1 | 12/2006 | Kah | |
| 2007/0034712 | A1 | 2/2007 | Kah | |
| 2007/0075542 | A1 | 4/2007 | Glaze | |
| 2007/0119975 | A1 | 5/2007 | Hunnicutt | |
| 2007/0119976 | A1 | 5/2007 | Kah | |
| 2007/0119978 | A1 | 5/2007 | Wang | |
| 2007/0128315 | A1 | 6/2007 | Szydlowski | |
| 2007/0131802 | A1 | 6/2007 | Kah | |
| 2007/0235565 | A1 | 10/2007 | Kah | |
| 2008/0034859 | A1 | 2/2008 | Runge | |
| 2008/0054092 | A1 | 3/2008 | Alexander | |
| 2008/0087743 | A1 | 4/2008 | Govrin | |
| 2008/0128531 | A1 | 6/2008 | Kah | |
| 2008/0142618 | A1 | 6/2008 | Smith | |
| 2008/0257982 | A1 | 10/2008 | Kah | |
| 2008/0308650 | A1 | 12/2008 | Clark | |
| 2009/0053226 | A1 | 2/2009 | Crowley | |
| 2009/0065606 | A1 | 3/2009 | Lee | |
| 2009/0072048 | A1 | 3/2009 | Renquist | |
| 2009/0130315 | A1 | 5/2009 | Vogel | |
| 2009/0173803 | A1 | 7/2009 | Kah | |
| 2009/0173804 | A1 | 7/2009 | Kah | |
| 2009/0177330 | A1 | 7/2009 | Carl | |
| 2009/0188988 | A1 | 7/2009 | Walker | |
| 2009/0278556 | A1 | 11/2009 | Man | |
| 2010/0029053 | A1 | 2/2010 | Itokawa | |
| 2010/0090024 | A1 | 4/2010 | Hunnicutt | |
| 2010/0098632 | A1 | 4/2010 | Russell | |
| 2010/0105865 | A1 | 4/2010 | Telford | |
| 2010/0108787 | A1 | 5/2010 | Walker | |
| 2010/0176217 | A1 | 7/2010 | Richmond | |
| 2010/0179310 | A1 | 7/2010 | Kamme | |
| 2010/0187331 | A1 | 7/2010 | Clark | |
| 2010/0236936 | A1 | 9/2010 | Brunner | |
| 2010/0243762 | A1 | 9/2010 | Onofrio | |
| 2010/0244438 | A1 | 9/2010 | Johanson | |
| 2010/0276512 | A1 | 11/2010 | Nies | |
| 2010/0301135 | A1 | 12/2010 | Hunnicutt | |
| 2010/0301142 | A1 | 12/2010 | Hunnicutt | |
| 2010/0327083 | A1 | 12/2010 | Kah | |
| 2011/0017842 | A1 | 1/2011 | Nations | |
| 2011/0036933 | A1 | 2/2011 | Kah | |
| 2011/0036993 | A1 | 2/2011 | Mano | |
| 2011/0043607 | A1 | 2/2011 | Grier | |
| 2011/0045005 | A1 | 2/2011 | Crowley | |
| 2011/0049875 | A1 | 3/2011 | Stults | |
| 2011/0057048 | A1 | 3/2011 | McAfee | |
| 2011/0084151 | A1 | 4/2011 | Dunn | |
| 2011/0095521 | A1 | 4/2011 | Crompton | |
| 2011/0108637 | A1 | 5/2011 | Kah | |
| 2011/0114569 | A1 | 5/2011 | Kim | |
| 2011/0121092 | A1 | 5/2011 | Scully | |
| 2011/0121097 | A1 | 5/2011 | Walker | |
| 2011/0238228 | A1 | 9/2011 | Woytowitz | |
| 2011/0239310 | A1 | 9/2011 | Cheng | |
| 2011/0248094 | A1 | 10/2011 | Robertson | |
| 2011/0248097 | A1 | 10/2011 | Kim | |
| 2011/0306169 | A1 | 12/2011 | Ye | |
| 2011/0309161 | A1 | 12/2011 | Renquist | |
| 2011/0309169 | A1 | 12/2011 | Kah | |
| 2012/0012670 | A1 | 1/2012 | Kah | |
| 2012/0041606 | A1 | 2/2012 | Standerfer | |
| 2012/0043398 | A1 | 2/2012 | Clark | |
| 2012/0061489 | A1 | 3/2012 | Hunnicutt | |
| 2012/0085840 | A1 | 4/2012 | Marino | |
| 2012/0118998 | A1 | 5/2012 | Drechsel | |
| 2012/0138832 | A1 | 6/2012 | Townsend | |
| 2012/0234940 | A1 | 9/2012 | Clark | |
| 2013/0015273 | A1 | 1/2013 | Onofrio | |
| 2013/0221128 | A1 | 8/2013 | Nations | |
| 2014/0014738 | A1 | 1/2014 | Walker | |
| 2014/0263735 | A1 | 9/2014 | Nations | |
| 2019/0076858 | A1 | 3/2019 | Clark | |
| 2021/0162449 | A1 | 6/2021 | McAfee | |
| 2021/0316325 | A1 | 10/2021 | Peleg | |
| 2021/0346902 | A1 | 11/2021 | Zimmerman | |
| 2022/0297140 | A1 | 9/2022 | McAfee | |
| 2023/0286003 | A1 | 9/2023 | Wright, III | |

FOREIGN PATENT DOCUMENTS

| | | | | |
|---|---|---|---|---|
| EP | 2206560 | A1 * | 7/2010 | B05B 15/74 |
| EP | 1492626 | B1 * | 12/2011 | B05B 1/262 |
| WO | WO-03086643 | A1 * | 10/2003 | B05B 1/262 |
| WO | 2004113777 | | 12/2004 | |
| WO | 2009152980 | | 12/2009 | |

(56) References Cited

FOREIGN PATENT DOCUMENTS

| | | | | |
|---|---|---|---|---|
| WO | WO-2011002928 A1 * | 1/2011 | ........... | B05B 3/0418 |
| WO | 2014011877 | 1/2014 | | |

OTHER PUBLICATIONS

International Search Report, International Patent Application No. PCT/US2013/050072, dated Nov. 7, 2013, 2 pages.
U.S. Appl. No. 61/602,948, filed Feb. 24, 2012 and entitled Arc Adjustable Rotary Sprinkler Having Full-Circle Operation And Automatic Matched Precipitation.
U.S. Appl. No. 61/790,142, filed Mar. 15, 2013 and entitled Matched Precipitation Rate Rotary Sprinkler.
U.S. Appl. No. 63/161,843, filed Mar. 16, 2021 and entitled Multi-Mode Rotor Sprinkler Apparatus And Method.
U.S. Appl. No. 13/776,044; Notice of Allowance mailed Apr. 23, 2015.
U.S. Appl. No. 14/209,910; Office Action mailed Dec. 16, 2015.
USPTO; U.S. Appl. No. 17/724,993; Non-Final Rejection mailed Apr. 14, 2025; (pp. 1-7).

* cited by examiner

MULTI-MODE ROTOR SPRINKLER APPARATUS AND METHOD

CROSS-REFERENCE TO RELATED APPLICATION

This application claims benefit of and priority to U.S. Provisional Application No. 63/161,843, filed Mar. 16, 2021.

TECHNICAL FIELD

The technical field relates to irrigation sprinklers and, more specifically, to apparatuses and methods for providing a multi-mode rotor-type sprinkler.

BACKGROUND

Sprinklers are commonly used for irrigating personal and commercial lawns, golf courses, and athletic and agricultural fields. Pop-up irrigation sprinklers are well known in the art, particularly for use in irrigation systems wherein it is necessary or desirable to embed the sprinkler in the ground so that it does not project appreciably above ground level when not in use. In a typical pop-up sprinkler, a tubular riser is mounted within a generally cylindrical upright sprinkler housing or case having an open upper end, with a spray head carrying one or more spray nozzles mounted at an upper end of the riser.

One type of pop-up sprinkler is a sprinkler having a rotary driven spray head mounted at the upper end of a pop-up riser, otherwise known as a rotor sprinkler. Rotor sprinklers generally include a rotating turret that sits on top of the riser. The turret includes at least one nozzle that discharges water from the rotating turret.

Rotor sprinklers commonly include in two forms. One form is a rotor sprinkler where the turret rotates through a full circle or 360-degree arc of rotation. The other form is where the turret reciprocates back and forth in a part circle (e.g., 90 degrees). Part circle type rotor sprinklers typically have a reversing mechanism that allows for setting the watering pattern to a desired angle range.

One concern in landscape irrigation is minimizing water waste and loss. Many communities regulate the use of water for irrigation, and these regulations may limit the amount of water usage, among other restrictions. Part circle rotor sprinklers may be useful in providing watering of a limited area in view of the above concerns. In conventional models, part circle rotor sprinklers operate so that a direction of the water stream from the nozzle oscillates between end limits, avoiding watering of areas that do not need watering, such as sidewalks, driveways, parking lots and the like. On the other hand, while full circle rotor sprinklers may improve water distribution by providing a larger area of irrigation, some full circle rotor sprinklers are not true full circle rotor sprinklers. Instead, they traverse through almost 360 degrees reversing once for every passing. The point where the rotor sprinkler reverses over waters this area radially outward from the sprinkler. In addition, many irrigation terrains require a mixture of the two rotor types, part circle and full circle. This requires two products to be made available, two products to be inventoried, and two products to be installed where incorrect installation could occur. Thus, there is a desire for a single rotor sprinkler that can operate in part circle mode and true full circle mode.

DETAILED DESCRIPTION

Figure 1:
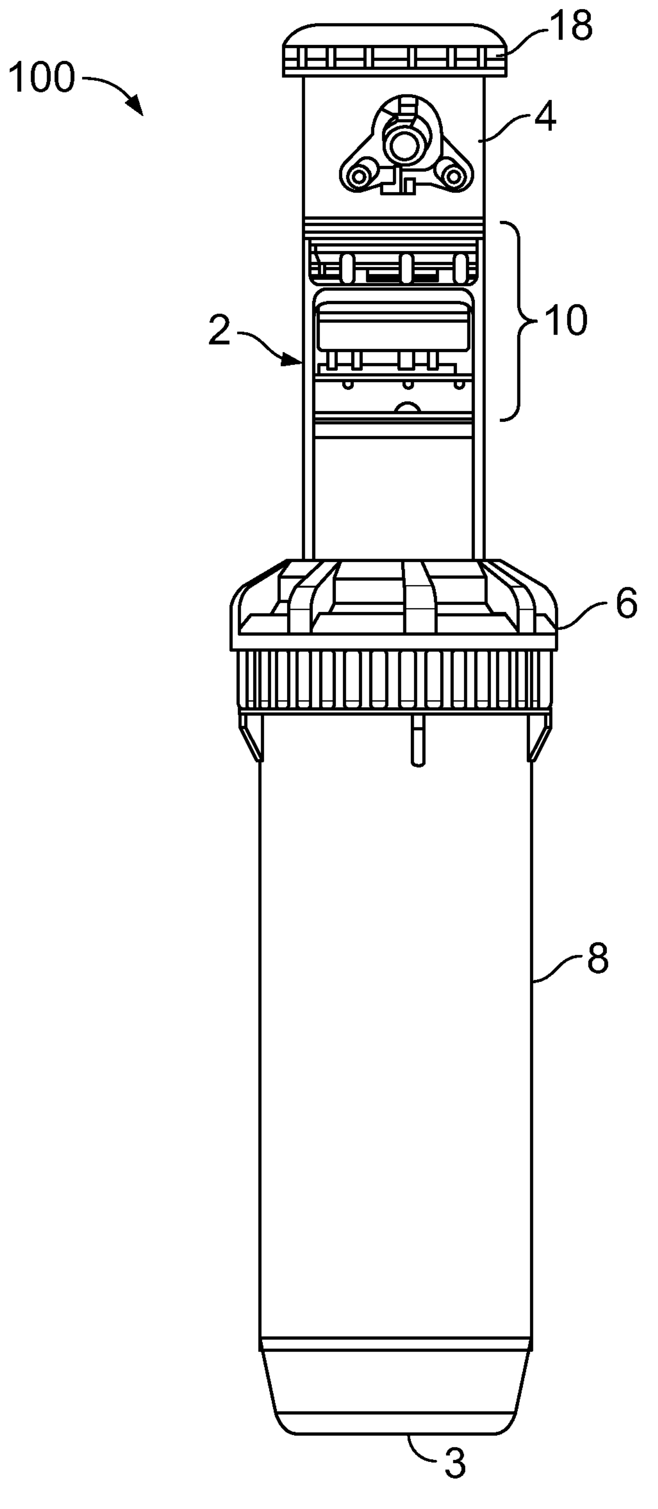
FIG. 1 is a perspective view of a rotor sprinkler according to some embodiments.
Figure 2:
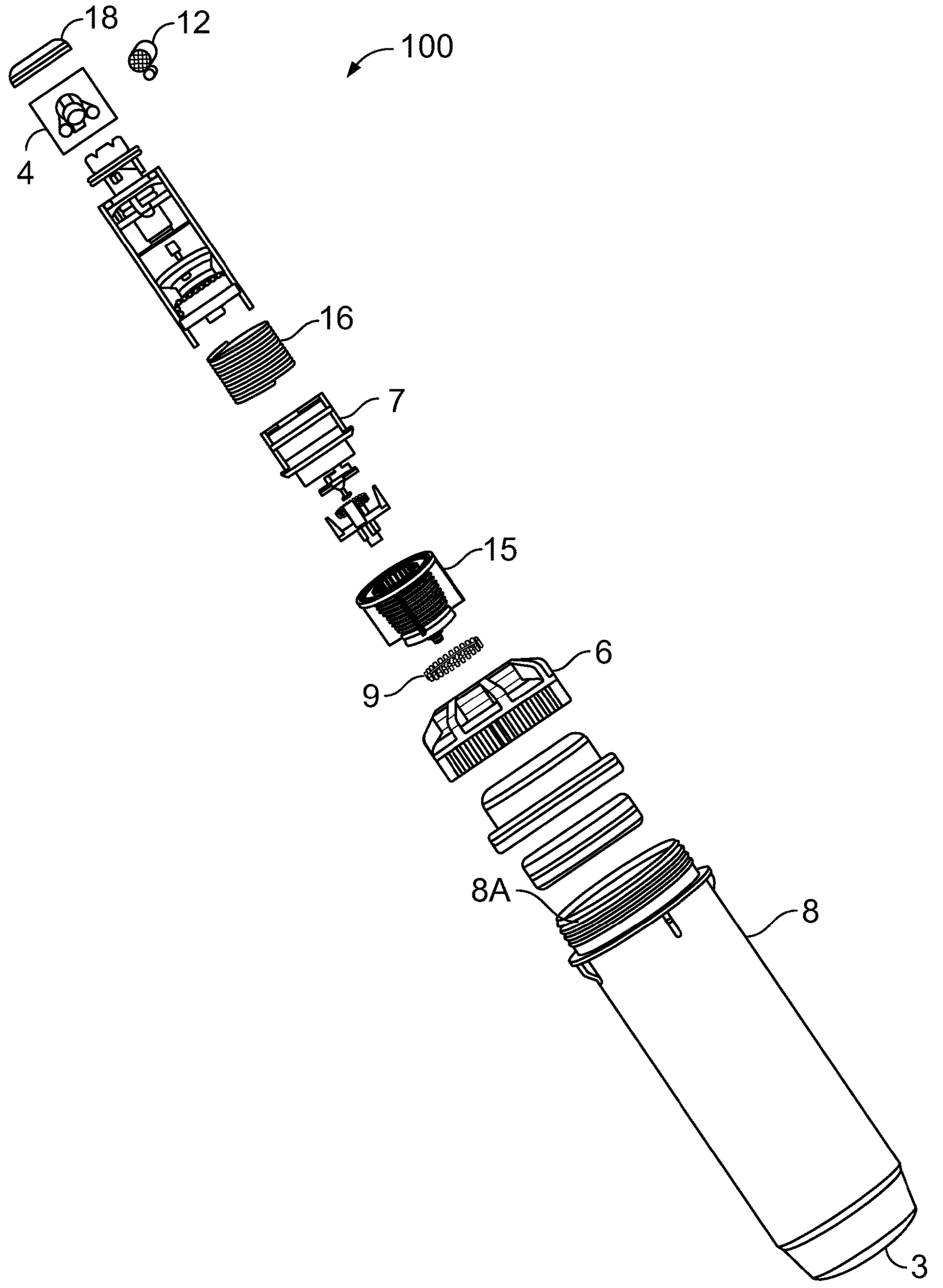
FIG. 2 is an exploded view of the sprinkler of FIG. 1.
Figure 3:
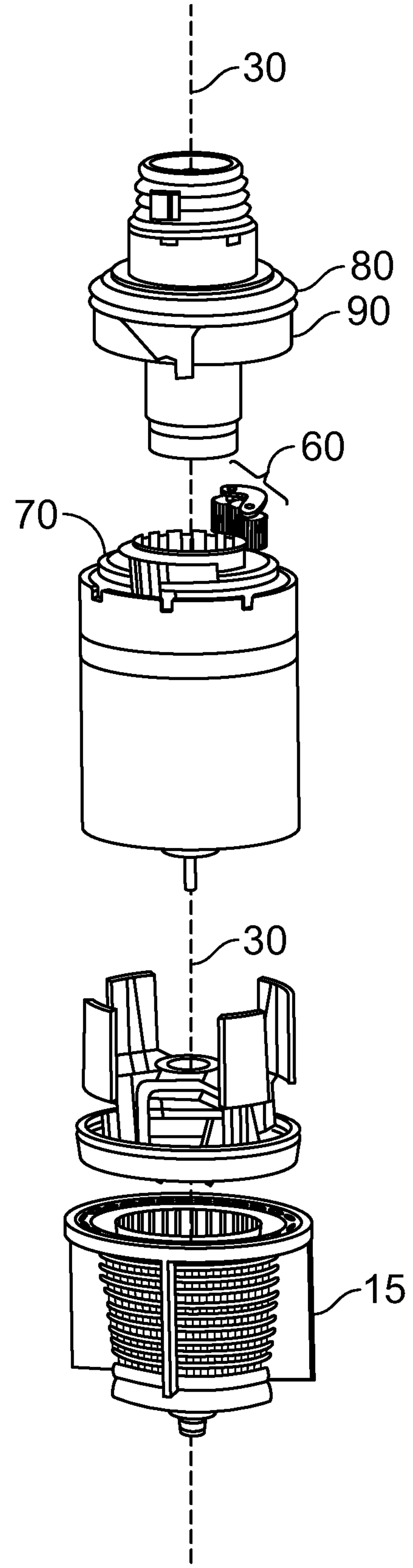
FIG. 3 is an exploded view of a subset of components of the sprinkler of FIG. 1.
Figure 4:
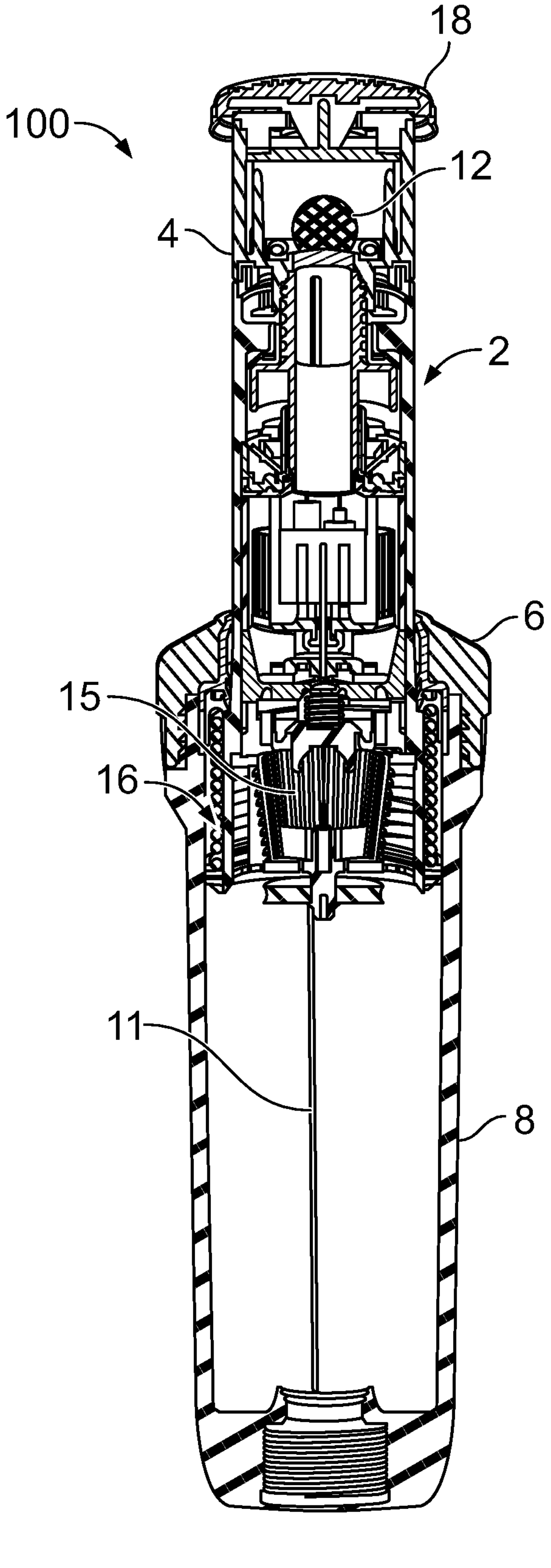
FIG. 4 is a cross-section view of the sprinkler of FIG. 1.
Figure 5:
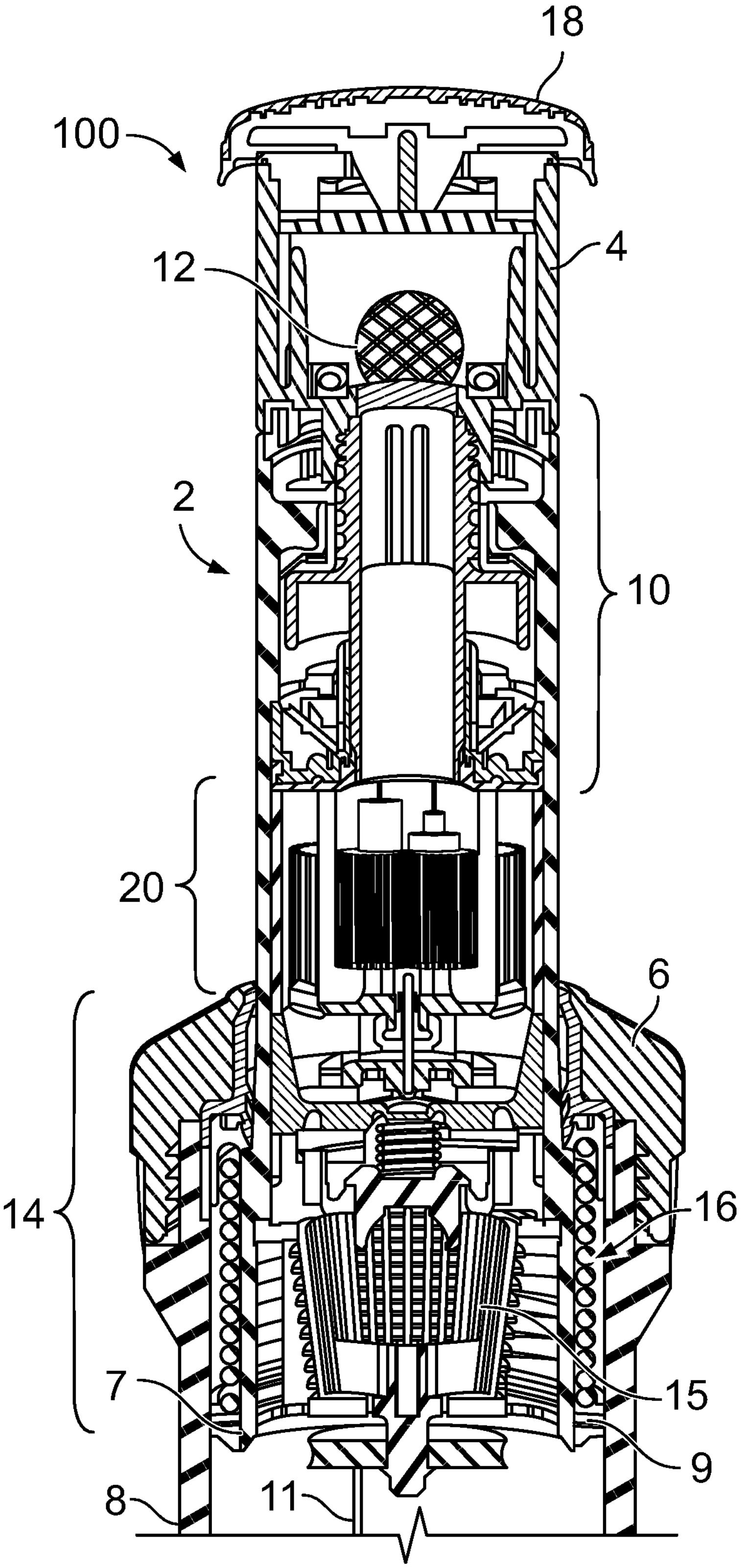
FIG. 5 is an enlarged view of a portion of FIG. 4.

As shown generally in FIGS. 1-5, an exemplary pop-up rotor sprinkler 100 having an improved arc setting mechanism 10 is illustrated. The sprinkler 100 enables adjustment between a part circle mode and a true full circle mode. The part circle mode allows one to set arc ranges to water an area less than a full circle. The true full circle mode enables full circle watering in one continuous direction (i.e., without reversing at any point).

The rotor sprinkler 100 generally comprises a case or housing 8 having an inlet 3 for receiving fluid; a riser 2 including a plurality of components for managing fluid pressure and facilitating a desired spray mode; a nozzle 12 (e.g., grid main nozzle) coupled to and disposed within a turret 4 for discharging pressurized fluid, and a central longitudinal axis 30. The turret 4 is coupled to the riser 2 at a distal end away from the housing 8. The riser 2 extends from the housing 8 when water is turned on and retracts in the housing 8 using a retraction spring 16 when the water is turned off. Additional examples of rotor sprinklers may be found in U.S. Pat. Nos. 4,787,558; 5,383,600; and 6,732,950, which are incorporated herein by reference in their entirety.

The housing 8 generally has an elongated cylindrical configuration formed typically from a lightweight injection molded plastic. The inlet 3 may be formed at one end of the housing 8 and receives pressurized fluid for irrigation. An opposite end 8A of the housing 8 may be configured (e.g., threaded) to accommodate mounting of a cover 6. The riser 2 is generally configured as an elongated hollow tube having a size and shape configured for slide-fit through the cover and reception into the interior of the housing 8. The riser 2 may also be constructed from a lightweight injection molded plastic.

A retraction spring 16 sits between the inside of a cover 6 of the housing 8 and a ratchet ring 9 at a bottom of the riser 2. The ratchet ring 9 sits above a bottom of a riser flange 7, and the retraction spring 16 sits into the ratchet ring 9. The ratchet ring 9 engages ribs 11 within the housing 8 and allows the riser 2 to slide and/or rotate if the torque exceeds the friction between the riser flange 7 and the ratchet ring 9. In operation, the water pressure overrides the bias of the spring 16, compresses the spring 16, and extends the riser 2 for irrigation. When the water is turned off, the spring 16 expands and urges the riser 2 into a retracted position into the interior of the housing 8. Further, when the riser 2 is in a retracted position, a riser cap 18 at an outboard end of the turret 4 is substantially seated at least flush with the cover 6.

As water passes through the sprinkler 100, it also passes through a turbine regulator module 14, for effective water use by the sprinkler 100. The turbine regulator module 14 may also include a filter 15 for eliminating debris. A gear reduction mechanism 20 is disposed in the riser 2 downstream of the turbine regulator module 14 and drives rotation of the turret 4 for discharging fluid through the nozzle 12. The arc setting mechanism 10 is disposed within the riser 2 downstream of the gear reduction mechanism 20 and may be set to enable the part circle mode and the true full circle mode.

Figure 6A:
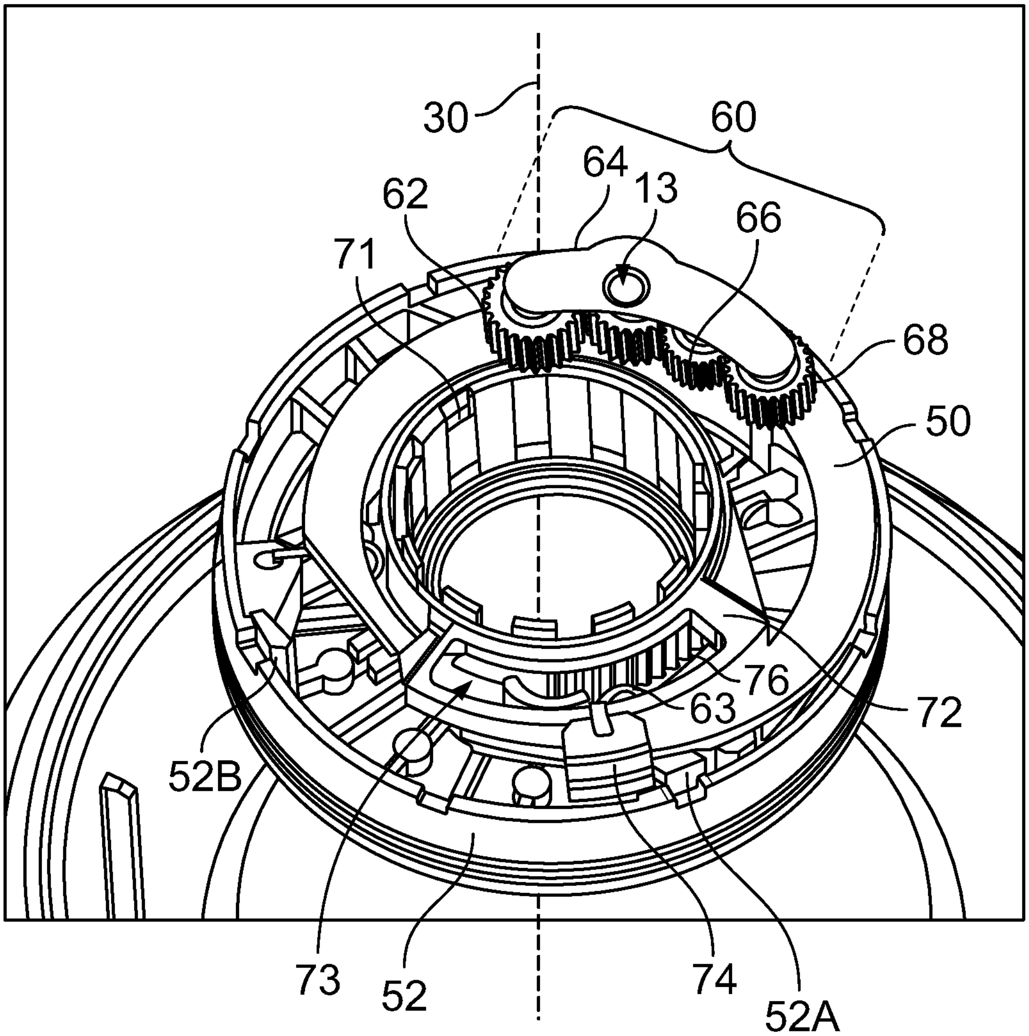
FIG. 6A is a perspective view of a gear rack, trip lever, and other components of an arc setting mechanism of the sprinkler of FIG. 1.
Figure 6B:
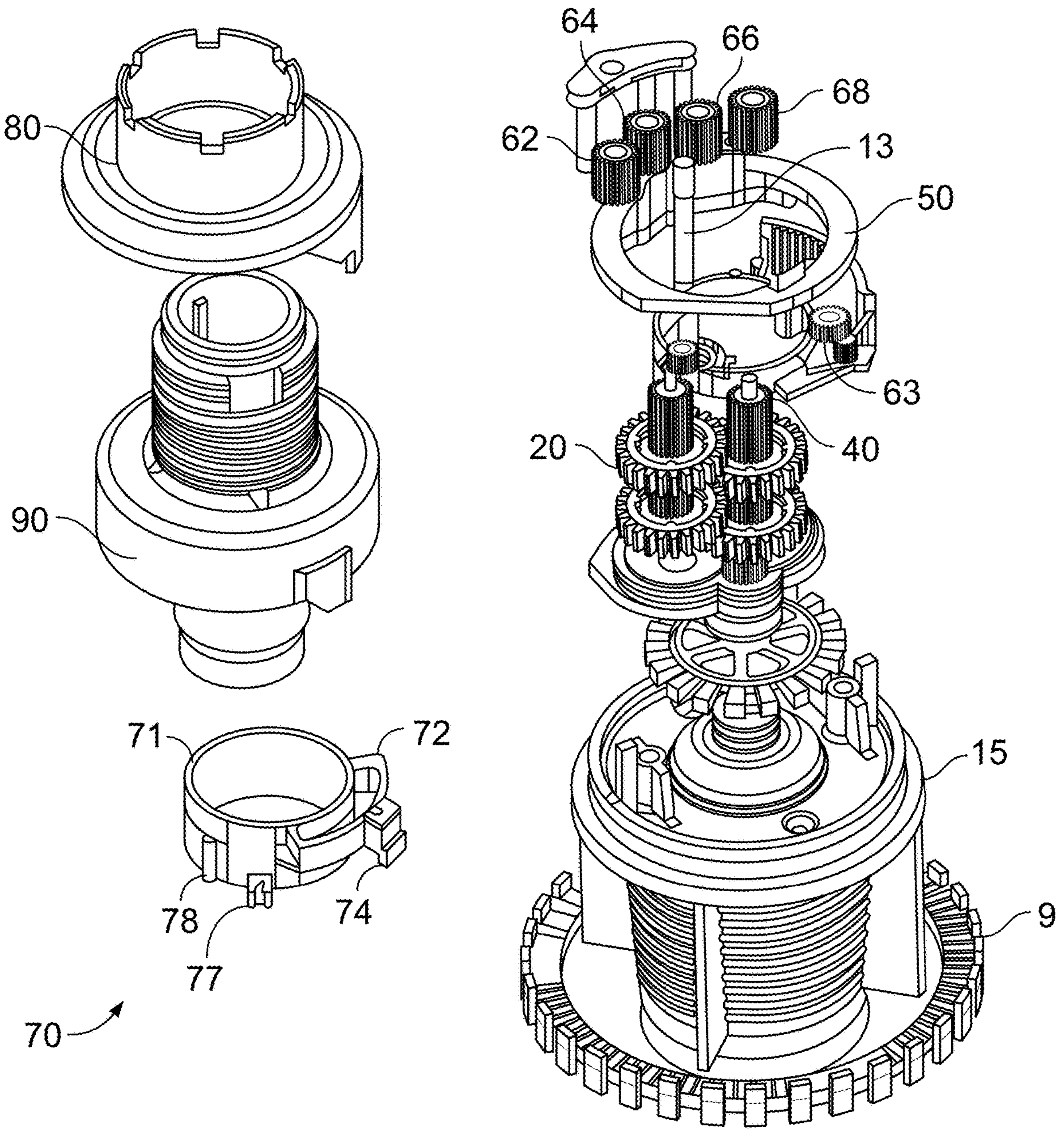
FIG. 6B is an exploded view of the arc setting mechanism and other components of the sprinkler of FIG. 1.

As shown in FIGS. 6A and 6B, the arc setting mechanism 10 includes a gear rack 60, a trip lever 70 operatively coupled to a trip plate 50, a trip hood 80, a ring gear 90, and a trip mount 52 with two fixed stops 52A (right stop), 52B (left stop) that limit the movement of the trip lever 70 to a predetermined arcuate range. The components of the arc setting mechanism 10 work in cooperation with the gear reduction mechanism 20 to rotate the turret 4 to dispense water through the nozzle 12 for irrigation over a selected target terrain area. Operation of the part circle mode and true full circle mode are described in further detail below with respect to FIGS. 10A-12C.

The gear rack 60 includes a plurality of gears including: a first drive gear 62, an input gear 64, an idler gear 66 and a second drive gear 68. The gear rack 60 is operatively coupled to the arc setting mechanism 10 to determine the direction of rotation for the turret 4. For example, in a part circle mode, the gear rack 60 pivots back and forth between clockwise rotation of the turret 4 (when drive gear 68 is engaged) and counterclockwise rotation of the turret (when drive gear 62 is engaged). The input gear 64 directly drives drive gear 62 and indirectly drives drive gear 68 through the idler gear 66. The input gear 64 is driven by a drive shaft or shaft 13 that is driven be the gear reduction mechanism 20. (See FIGS. 6A and 6B.)

Figure 7A:
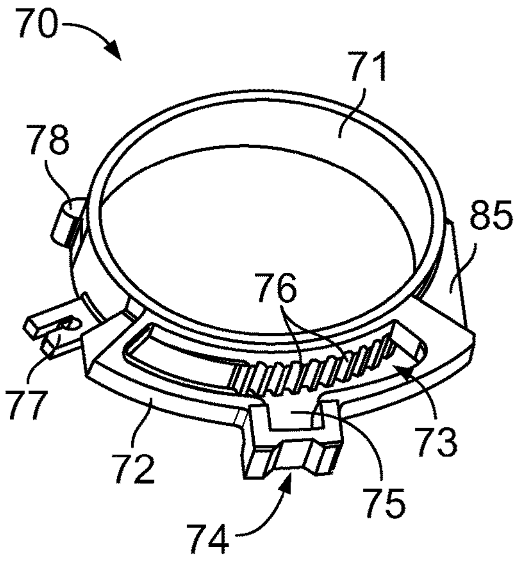
FIG. 7A is a perspective view of a trip lever in a neutral state of the sprinkler of FIG. 1.
Figure 7B:
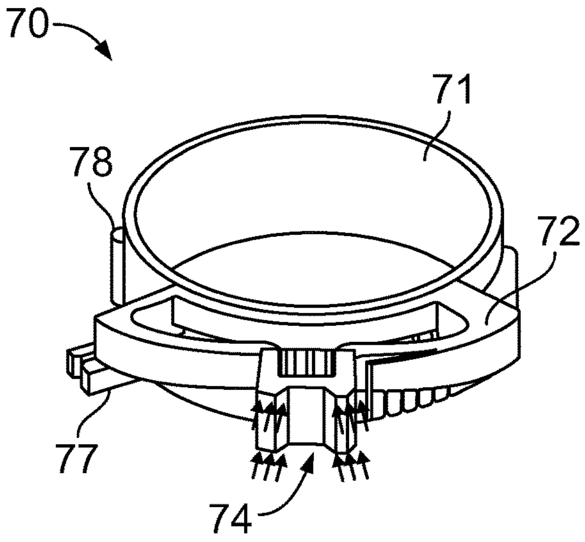
FIG. 7B is a perspective view of the trip lever of FIG. 7A in a deflected state.
Figure 7C:
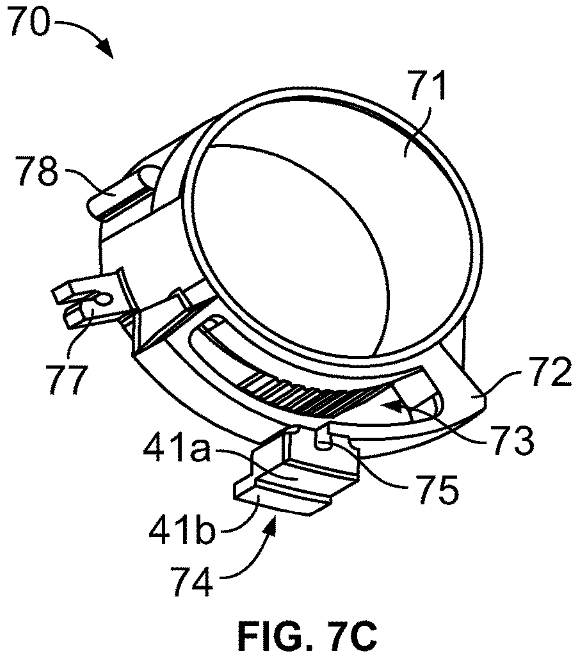
FIG. 7C is a perspective view of an alternative trip lever in a neutral state for use with the sprinkler of FIG. 1.

With reference to FIGS. 7A-7C, the trip lever 70 generally includes a ring 71, an arcuate member 72 and a toggle 74. The materials of the components of the trip lever 70 are designed to cooperate with the mode of operation of the rotor sprinkler 100. For example, the arcuate member 72 may include a coring 73 that allows radially inward flexibility. This inward flexibility enables the toggle 74 to move inward and allow tabs or trips 82 and 92 to pass by in full circle mode. In some embodiments, the toggle 74 may be also formed from a thermoplastic material. The arcuate member 72 may be formed with a stiffer response in a tangential direction. For instance, material at the connection of the arcuate member 72 to the ring 71 may be increased relative to that of the arcuate member 72 itself. Further, a web 85 may extend between the arcuate member 72 and the ring 71. The arcuate member 72 may be formed with relatively less material to provide reduced stiffness in a radial direction, which facilitates inward radial movement of the toggle 74 and the arcuate member 72 to enable the full circle mode.

Figure 16:
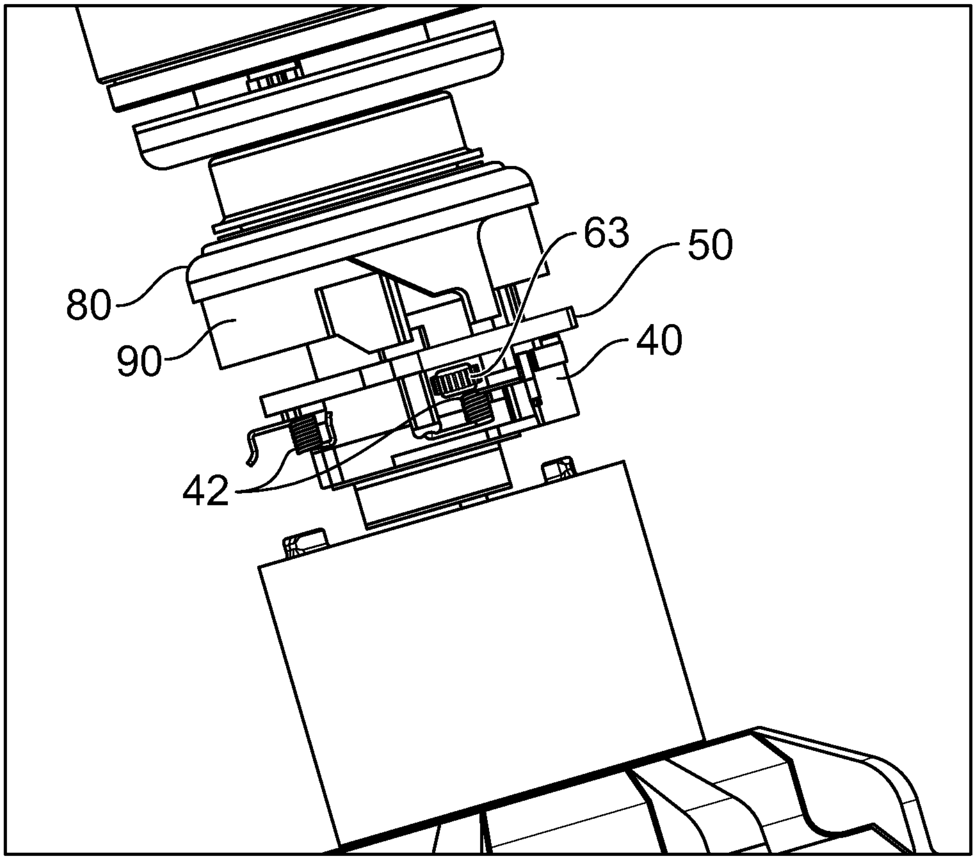
FIG. 16 is another perspective view of a subset of the components of the rotor sprinkler of FIG. 1, illustrating multiple trip springs, and the rack idler.

The ring 71, the arcuate member 72 and the toggle 74 may be formed of a single piece. An arcuate gap or coring 73 may be defined between the ring 71 and the arcuate member 72. The trip lever 70 may also include a boss 78 that may be configured to aide alignment of the ring 71 relative to a rack idler 40. A second idler gear 63, as shown in FIG. 6A and FIG. 16, moves along and between the rack idler 40 and teeth 76 defined on an outer surface of the ring 71 as the toggle 74 toggles between the stops 52A, 52B.

Figure 14:
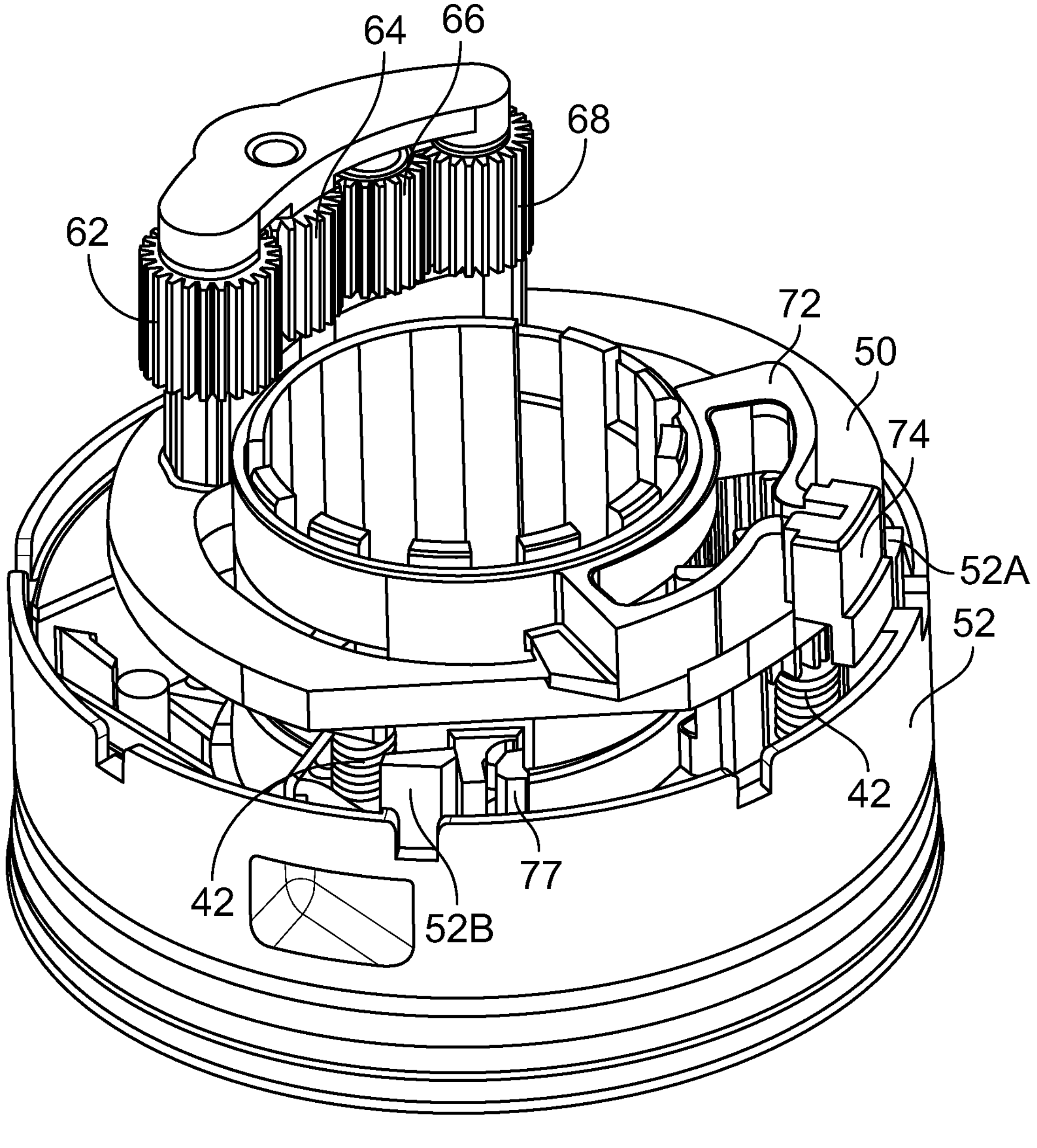
FIG. 14 is a perspective view of a portion of a trip lever coupled to a trip spring of the arc setting mechanism of the sprinkler of FIG. 1.

As illustrated in FIG. 14, an attachment arm 77 extends radially from the trip lever 70. Trip springs 42 are operatively connected to the trip lever 70 and the trip mount 52 to facilitate back and forth rotation of the trip lever 70. The attachment arm 77 defines a stepped notch 44 defined for attaching one end of the trip spring 42 in a secure fashion. The stepped notch 44 prevents the trip spring 42 from dislodging in the event of air slam or other impact to the sprinkler 100. (Note, while FIG. 16 illustrates the placement of the trip springs 42, both the trip lever 70 and the trip mount 52 have been removed from FIG. 16 for illustration purposes only.)

Embodiments of the toggle 74 may have a plurality of profile configurations. One example of a toggle is a double columnar profile, as illustrated in FIGS. 7A-7B, 12A-12C. Another example is a stepped profile, as illustrated in FIGS. 6A, 7C, 10A, 10B. The stepped profile of the toggle 74 has a first wall 41*a* (i.e., upper portion) and a second wall 41*b* (i.e., lower portion). The walls 41*a*, 41*b* extend to different radiuses from the center of the ring 71. The second wall 41*b* extends further than the first wall 41*a* so that the second wall 41*b* can engage the stops 52A, 52B that limit movement of the ring 51 when it toggles between different directions of rotation in part circle mode. The first wall 41*a* does not extend out as far because it is deflected inward by the fixed trip in the full circle mode. This smaller radial extension reduces the amount of inward deflection of the toggle 74 in the full circle mode. It also ensures that the friction between the fixed trip 92 over the toggle 74 in the full circle mode is low enough that it does not trip the trip lever 70 to change the rotational direction of the sprinkler 100.

Both profile configurations of the toggle 74 may define a notch 75. The notch 75 improves flexibility of the toggle 74 for inward movement of the toggle 74 when it engages an angled cam surface 95 of the fixed trip 92 in full circle mode. A deflected state of the toggle 74 is illustrated in FIG. 7B. An undeflected state of the trip lever 70 is illustrated in FIGS. 7A and 7C. The gap 73 defined between the arcuate member 72 and the ring 71 is smaller in size as the toggle 74 passes the fixed trip 92 in the full circle mode. More specifically, the gap 73 has a first size when the toggle 74 is spaced from the fixed trip 92 and a second size when the toggle 74 is deflected inward by the fixed trip 92, the first size being larger than the second size. Additional features of the full circle mode will be described in further detail with respect to FIGS. 12A-12C.

The alignment and positioning of the adjustable trip 82 relative to the fixed trip 92 determines the mode of operation of the rotor sprinkler 100. When the trips 82, 92 are at least partially overlapped, the sprinkler 100 is in full circle mode. When the trips 82, 92 are spaced from one another, the sprinkler 100 is in part circle mode.

Figure 8A:
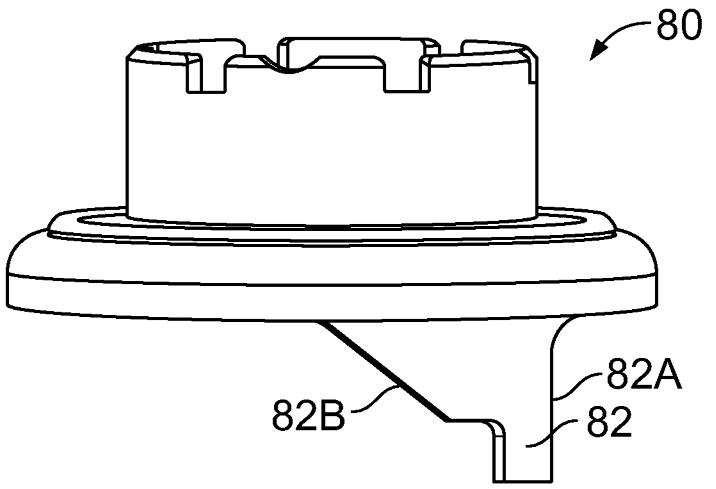
FIG. 8A is a perspective view of a trip hood of the arc setting mechanism of the sprinkler of FIG. 1.
Figure 8B:
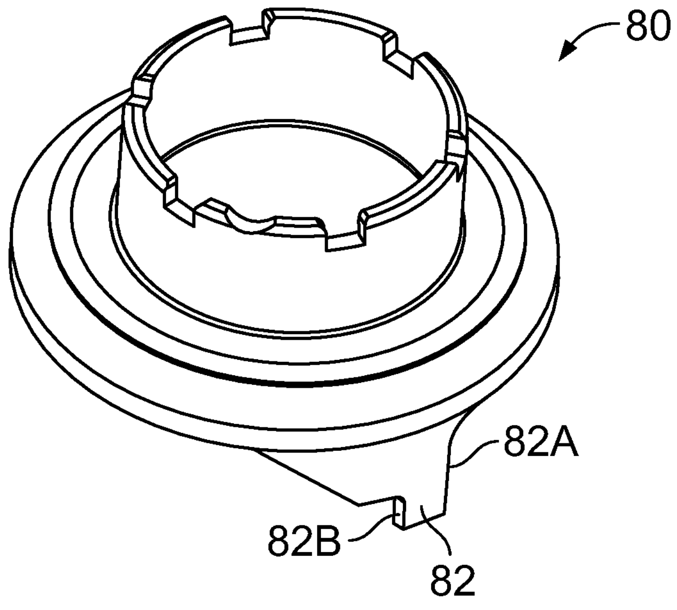
FIG. 8B is another perspective view of the trip hood of FIG. 8A.

Referring to FIGS. 8A and 8B, the trip hood 80 of the arc setting mechanism 10 includes the adjustable trip 82. The trip hood 80 and the adjustable trip 82 may be a single piece. The adjustable trip 82 includes a right side 82A and a left side 82B.

Figure 9:
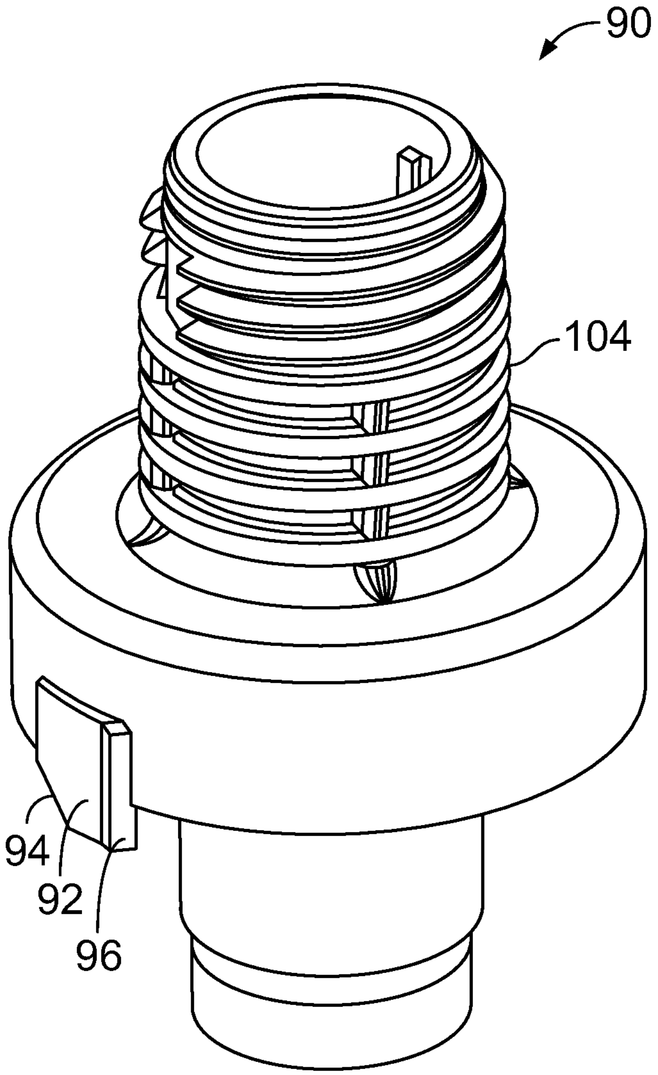
FIG. 9 is a perspective view of a ring gear of the arc setting mechanism of the sprinkler of FIG. 1.

With reference to FIG. 9, the ring gear 90 includes the fixed trip 92. The fixed trip 92 includes a left side 94 and a right side 96. The left side 94 includes an angled cam surface 95 that is angled inward. In full circle mode, the adjustable trip 82 is overlaid at least partially on the fixed trip 92, and the angled cam surface 95 deflects inward the toggle 74 extending from the arcuate member 72. As a result, the aligned trips 82, 92 pass over the toggle 74. That is, the toggle 74 does not engage the trips 82, 92 in a manner that would cause switching the direction of the arc setting mechanism 10. Thus, there is continuous rotation of the trips 82, 92 and the turret 4 in a single direction.

Figure 15:
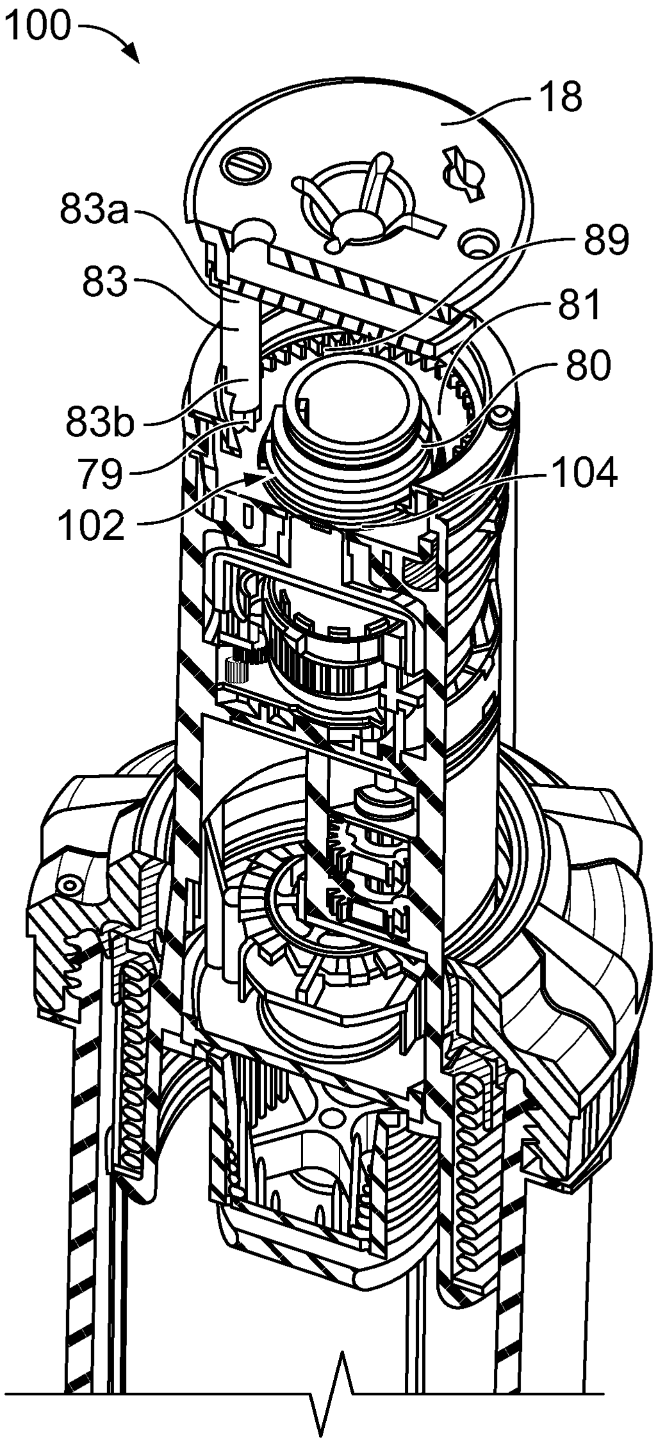
FIG. 15 is a cross-section view of a subset of the components of the rotor sprinkler of FIG. 1.

As shown in FIG. 15, there is an arc adjustment stem or stem 83 that is accessible through the cover 18 of the turret 4 to adjust the adjustable trip 82 relative to the fixed trip 92 to set the arc pattern in part circle mode. The stem 83 extends upstream in the turret 4 and operatively couples to an adjustment ring 81. The stem 83 has an outboard end 83*a* configured to be manually turned by a tool, such as a screwdriver, and the inboard end 83*b* includes teeth 79 that mesh with inner teeth 89 on the adjustment ring 81. When the stem 83 is turned, it rotates the adjustment ring 81. The adjustment ring 81 is operatively coupled to the trip hood 80 so that the trip hood 80 rotates with the adjustment ring 81. In this case, the adjustment ring 81 is keyed to the trip hood 80 through notches 102 on the adjustment ring 81 that receive projections 104 extending from the trip hood 80.

Figure 10A:
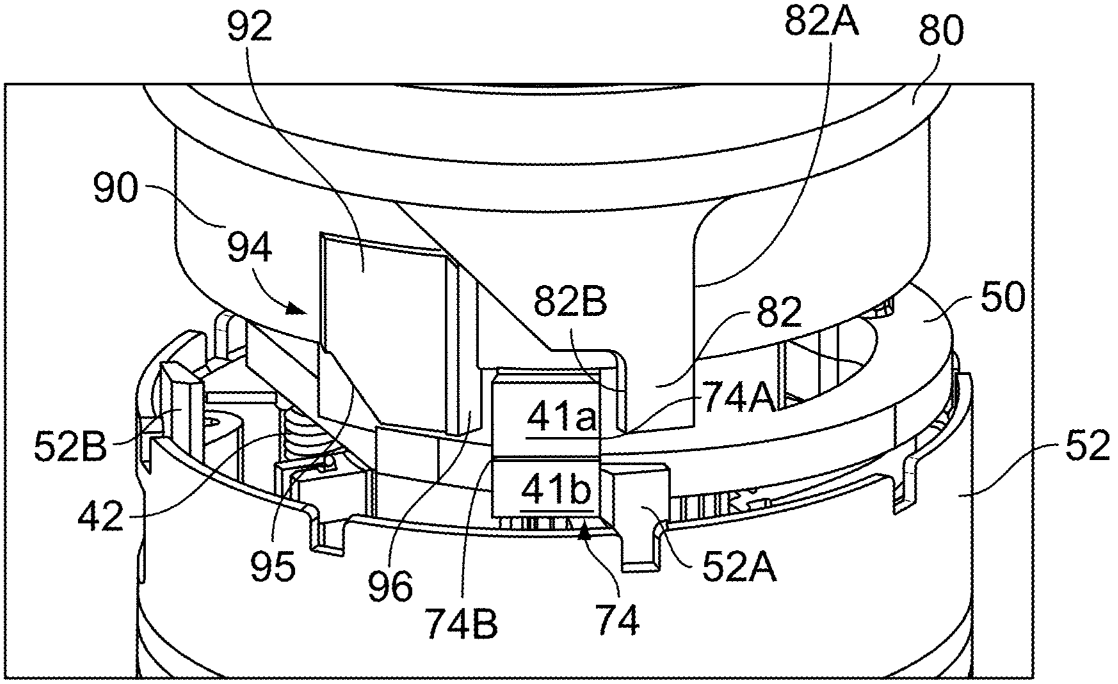
FIG. 10A is a perspective view of the arc setting mechanism of the sprinkler of FIG. 1 in part circle mode.
Figure 10B:
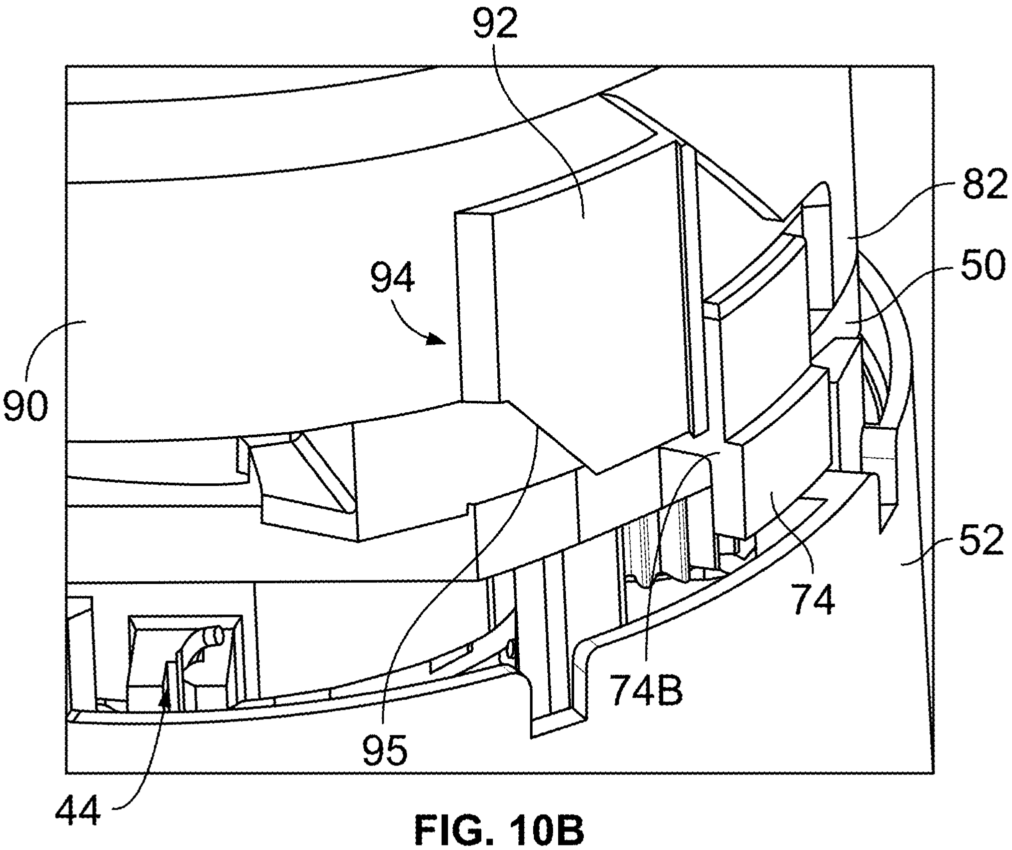
FIG. 10B is an enlarged alternative perspective view of the arc setting mechanism of FIG. 10A.
Figure 11:
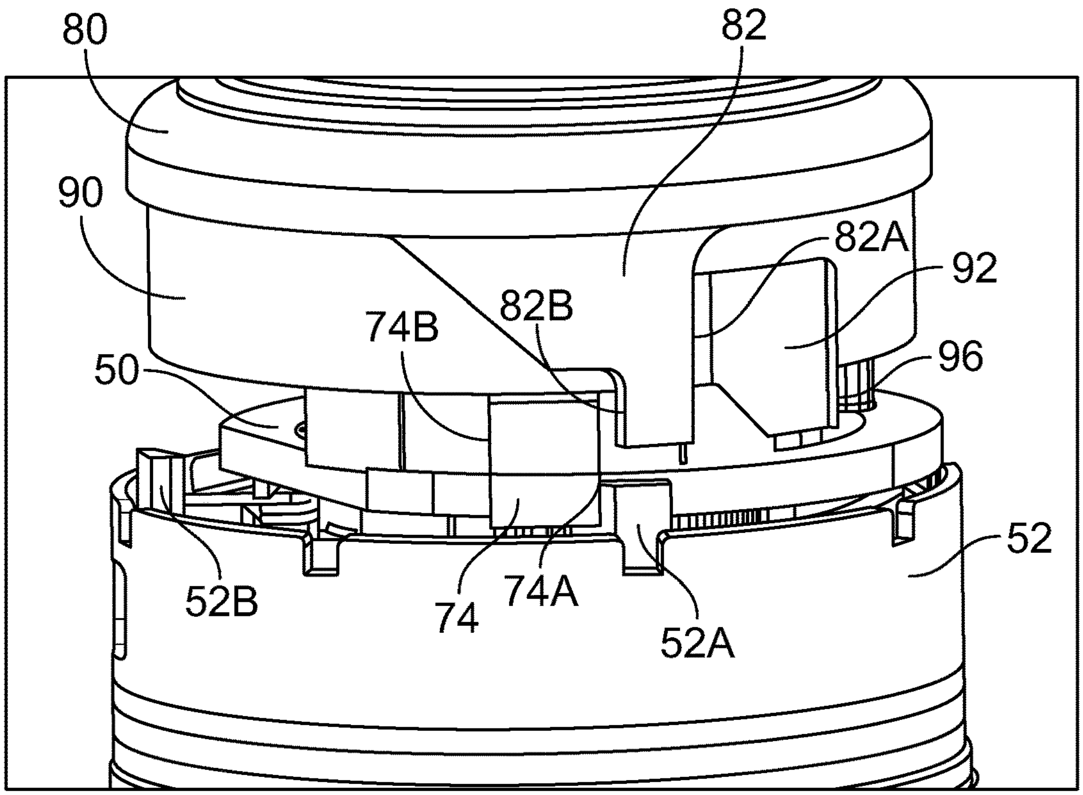
FIG. 11 is another perspective view of the arc setting mechanism of FIG. 10A set in a different configuration.
Figure 12A:
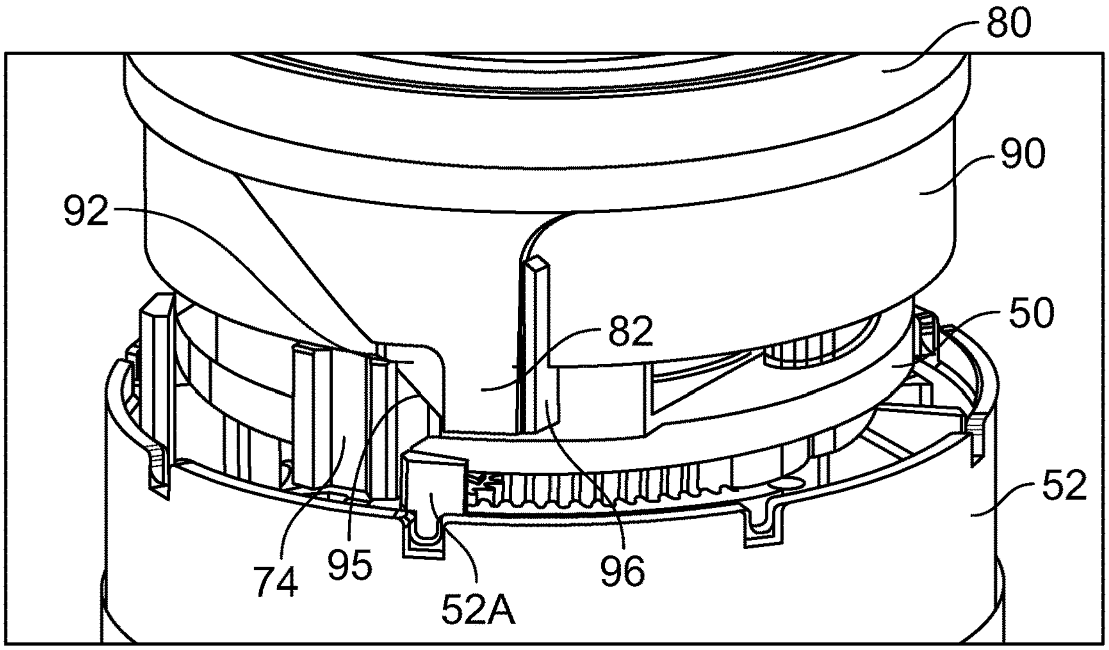
FIG. 12A is a perspective view of the arc setting mechanism of the sprinkler of FIG. 1 in a full circle mode.
Figure 12B:
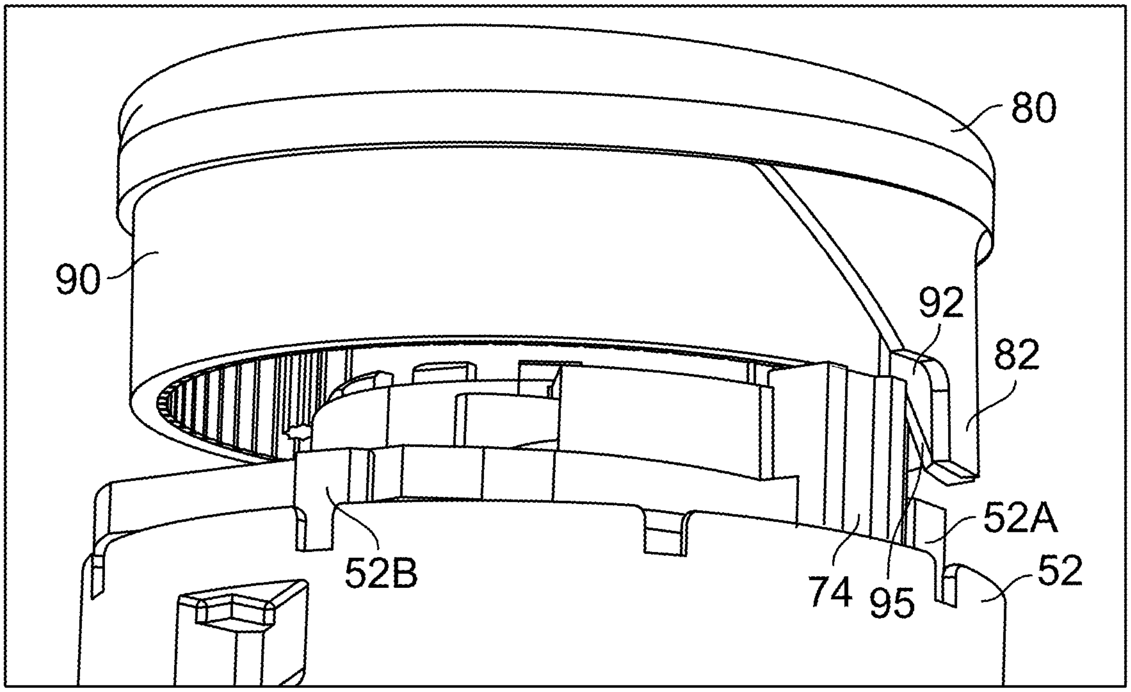
FIG. 12B is another perspective view of the arc setting mechanism of the sprinkler of FIG. 1 in a full circle mode.
Figure 12C:
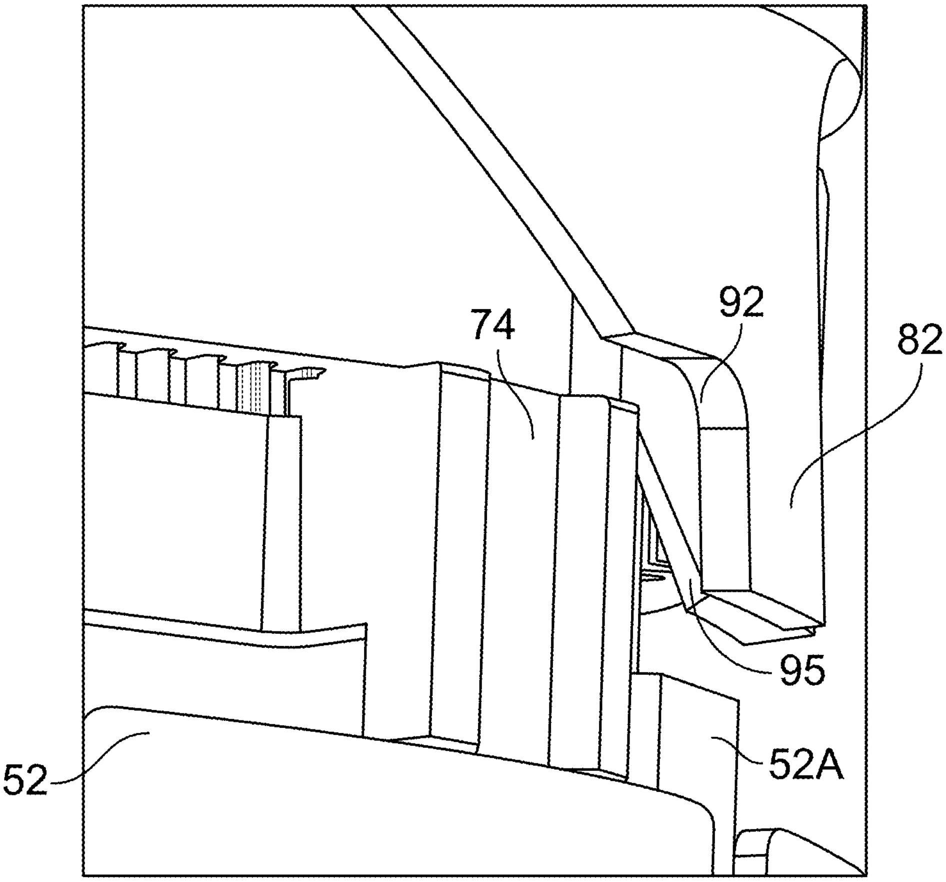
FIG. 12C is another perspective view of the arc setting mechanism of the sprinkler of FIG. 1 in a full circle mode.
Figure 13A:
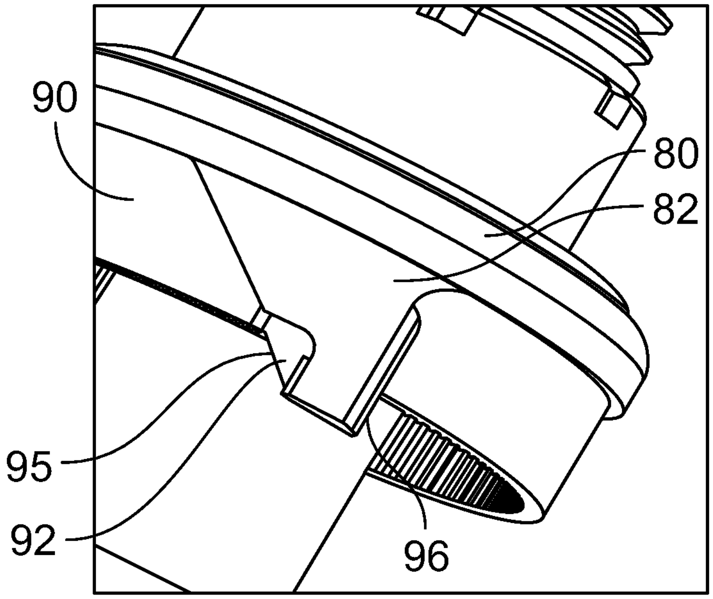
FIG. 13A is a perspective view of the ring gear and the trip hood of the arc setting mechanism of the sprinkler of FIG. 1 in a full circle mode.
Figure 13B:
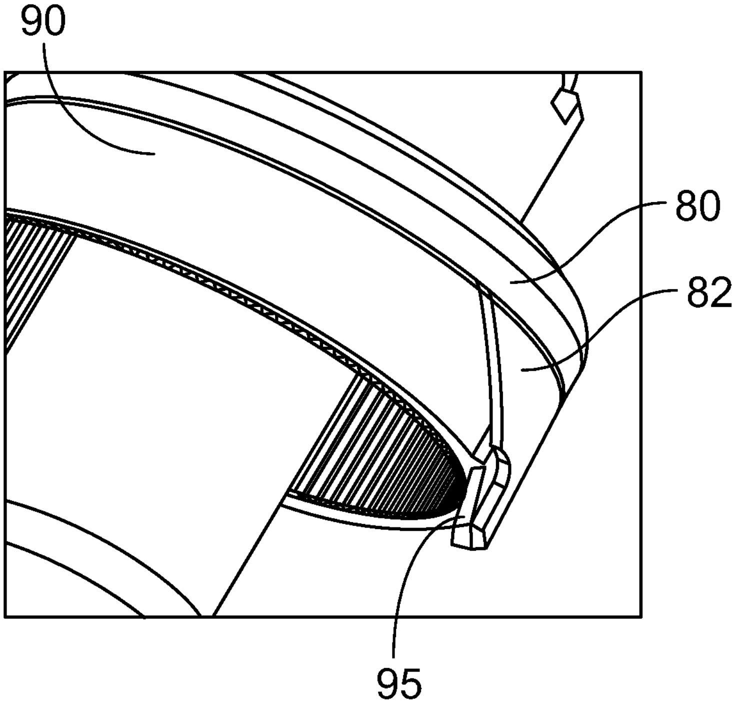
FIG. 13B is another perspective view of the ring gear and the trip hood of the arc setting mechanism of the sprinkler of FIG. 1 in a full circle mode.

FIGS. 10A-11 illustrate a minimum part circle mode setting for the adjustable trip 82 and the fixed trip 92. The trips 82 and 92 are set close to each side of the toggle 74 and rotate in the same direction until one of them engages the toggle 74 and moves the toggle 74 from one of the stops 52A, 52B to the other of stops 52A, 52B. Once the toggle is moved, the trips 82, 92 rotate in the other direction until one of them engages the toggle 74 and moves the toggle to the other stop 52A, 52B.

More specifically, with reference to FIGS. 10A and 10B, the left side 82B of the adjustable trip 82 on the trip hood 80 is illustrated as it is about to contact the right side 74A of the toggle 74 on the trip lever 70, when rotating in the clockwise direction. This contact will initiate moving the toggle 74 from one stop 52A to the other stop 52B. Once the toggle 74 contacts the other stop 52B, counterclockwise rotation will begin. The fixed trip 92 will soon contact the left side 74B of the toggle 74 and initiate moving the toggle 74 back to stop 52A. Once the trip lever 70 contacts the stop 52A, clockwise rotation will start. Thus, in this configuration, the arc of coverage matches the arcuate distance between the stops 52A, 52B. The trip spring 42 maintains the toggle 74 at one of the stops 52A, 52B until contacted to move to the other of the stops 52A, 52B.

FIG. 11 illustrates a maximum arc of coverage. In this configuration, the adjustable trip 82 and the fixed trip 92 are close to one another but to one side of the toggle 74. During clockwise rotation, the left side 82B of the adjustable tab 82 engages the right side 74A of the toggle 74. This contact initiates the toggle 74 to move from stop 52A to stop 52B. Once the toggle 74 engages stop 52B, counterclockwise rotation will begin. In a counterclockwise rotation, the fixed tab surface 96 ultimately engages a left side 74B of the toggle 74. When that contact occurs, the toggle 74 will move from stop 52B back to stop 52A, and the rotation will be reversed back to clockwise. This switching back and forth in rotation continues until the watering cycle is complete.

With reference to FIGS. 12A-12C and 13A-13B, the user engages the full circle mode of the rotor sprinkler 100 by using the stem 83 to move the adjustable trip 82 on the trip hood 80 so that it at least partially overlaps with the fixed trip 92 on the ring gear 90. The preferred overlap configuration has the adjustable trip 82 substantially overlapped with the fixed trip 92. To achieve this overlap, one turns the stem 83 counterclockwise until this movement is stopped by engagement of the right side 82A of the adjustable trip 82 with the fixed trip 92 on the ring gear 90. Thus, the rotor sprinkler 100 uses the same arc adjustment stem 83 to operate the part circle mode and to set the rotor sprinkler 100 to full circle mode.

In this position, the trips 82, 92 pass by the toggle 74 in the clockwise direction because the angled cam surface 95 engages and deflects the toggle 74 inward. This inward deflection of the toggle 74 occurs once during each revolution of the trips 82, 92. If the sprinkler 100 is set to counterclockwise rotation when the user activates the full circle mode, the trips 82, 92 will move into contact with the left side 74B of the toggle 74, which causes it to move from stop 52B to stop 52A. This will switch the direction of the rotor sprinkler 100 to clockwise rotation. The rotor sprinkler 100 will then remain in clockwise rotation until a user switches it to part circle mode.

The above embodiments provide several benefits, advantages, and improvements over existing sprinkler technologies. For example, the full circle mode of these embodiments provides a true full circle mode. That is, the sprinkler provides continuous full circle motion in one direction, as opposed to reversing. This provides improved water distribution, allowing every portion of an irrigated terrain area to receive a uniform water distribution, rather than permitting additional watering at the edges of the arc in full circle reversing rotors.

Further combining the part-circle and true full circle functionality in a single sprinkler eliminates the need for separate rotors to achieve both these functionalities. This helps optimize distribution, stocking, ease of installation and service. It also minimizes line change overs during manufacturing.

Further, the switch from one mode to the other may be made manually by an installer or end user, who may be able to adjust a mode of one or more of a plurality of sprinklers within an irrigation system. In some embodiments, adjustment of the arc setting mechanism may be made by engaging the appropriate components through a cap of the riser, without opening up, taking out, or exchanging components within the rotor sprinkler.

It will be understood that various changes in the details, materials, and arrangements of parts and components which have been described and illustrated above to explain the nature of the sprinkler may be made by those skilled in the art within the principle and scope of the sprinkler as expressed in the following claims. Furthermore, while various features have been described with regard to a particular embodiment or a particular approach, the foregoing description and accompanying drawings is offered by way of illustration only and not as a limitation. Further, while embodiments have been shown and described, it will be apparent to those skilled in the art that modifications may be made to them without departing from the broader aspects of the technological contribution. The actual scope of the protection sought is defined in the following claims.

What is claimed is:

1. A multi-mode irrigation sprinkler, comprising:

a nozzle for dispensing fluid;

a set of gears for rotating the nozzle; and an arc setting mechanism that, cooperates with the set of gears, and switches between a part circle mode for the nozzle and a full circle mode for the nozzle, the arc setting mechanism comprising:

a fixed tab for switching to a first direction for the nozzle;

an adjustable tab movable relative to the fixed tab for setting an arc of rotation for the nozzle when in the part circle mode and for switching to a second direction for the nozzle; and a toggle for engaging the fixed tab and the adjustable tab to switch between the first direction and the second direction when in the part circle mode;

the adjustable tab being moveable radially outwardly to set the full circle mode and such that the fixed tab is positioned to deflect the toggle radially inward to move past the toggle during an operational state of the full circle mode, allowing continuous rotation of the nozzle in one of the first direction and the second direction.

2. The sprinkler of claim 1, wherein the fixed tab includes an angled surface that deflects the toggle inward in the full circle mode.

3. The sprinkler of claim 1, wherein the arc setting mechanism further comprises a trip lever, the toggle being spaced from the trip lever to define a gap therebetween such that the toggle deflects at least in part into the gap to pass by the fixed tab in the full circle mode.

4. The sprinkler of claim 3, wherein the trip lever includes a ring to mount the trip lever in the arc setting mechanism.

5. The sprinkler of claim 4, wherein the trip lever includes at least one arcuate member spaced from the ring to support the toggle, the arcuate member defining the gap such that the gap is between the ring of the trip lever and the toggle.

6. The sprinkler of claim 5, wherein the gap has a first size when the toggle is spaced from the fixed tab, and a second size when the toggle is deflected inward by the fixed tab, the first size being larger than the second size.

7. The sprinkler of claim 1, wherein the toggle includes a first wall and a second wall, the first wall engages the fixed tab in full circle mode and the second wall is disposed at least in part radially outward of the first wall.

8. The sprinkler of claim 1, wherein the full circle mode is manually set.

9. The sprinkler of claim 1, wherein the set of gears includes a plurality of gears for enabling a clockwise rotation of the nozzle and a counterclockwise rotation of the nozzle.

10. An arc setting mechanism for a multi-mode rotor sprinkler having a nozzle for dispensing fluid, the arc setting mechanism comprising:

a fixed tab for switching to a first direction for the nozzle; and an adjustable tab, movable relative to the fixed tab, for switching to a second direction for the nozzle;

a toggle for engaging the fixed tab and the adjustable tab to switch between the first direction and the second direction in a part circle mode;

the adjustable tab being moveable radially outwardly to set a full circle mode and such that the fixed tab is positioned to deflect the toggle radially inward to move past the toggle during an operational state of the full circle mode, allowing continuous rotation of the nozzle in one of the first direction and the second direction in the full circle mode.

11. The arc setting mechanism of claim 10, wherein the fixed tab includes an angled surface that deflects the toggle inward when the fixed tab passes by the toggle in the full circle mode.

12. The arc setting mechanism of claim 10 further comprising a trip lever, the toggle being spaced from the trip lever to define a gap therebetween such that the toggle deflects at least in part into the gap in the full circle mode.

13. The arc setting mechanism of claim 12, wherein the trip lever includes a ring to mount the trip lever in the arc setting mechanism.

14. The arc setting mechanism of claim 13, wherein the trip lever includes at least one arcuate member spaced from the ring to support the toggle.

15. The arc setting mechanism of claim 14, wherein the gap has a first size when the toggle is spaced from the fixed tab and a second size when the toggle is deflected inward by the fixed tab, the first size being larger than the second size.

16. The arc setting mechanism of claim 10, wherein the toggle includes a first wall and a second wall, and the first wall engages the fixed tab and the second wall is disposed at least in part radially outward of the first wall.

17. The arc setting mechanism of claim 11, wherein the full circle mode is manually set.

* * * * *